United States Patent
Born et al.

(10) Patent No.: US 11,338,228 B2
(45) Date of Patent: May 24, 2022

(54) CONTINUOUS ROTARY PLATE FILTER AND METHODS OF USE THEREOF

(71) Applicant: Continuus Pharmaceuticals, Inc., Woburn, MA (US)

(72) Inventors: Stephen C. Born, Belmont, MA (US); Joshua Dittrich, Brookline, MA (US); Bayan T. Takizawa, Sudbury, MA (US); Salvatore Mascia, Boston, MA (US)

(73) Assignee: Continuus Pharmaceuticals, Inc., Woburn, MA (US)

( * ) Notice: Subject to any disclaimer, the term of this patent is extended or adjusted under 35 U.S.C. 154(b) by 0 days.

(21) Appl. No.: 16/075,007

(22) PCT Filed: Feb. 3, 2017

(86) PCT No.: PCT/US2017/016589
§ 371 (c)(1),
(2) Date: Aug. 2, 2018

(87) PCT Pub. No.: WO2017/136779
PCT Pub. Date: Aug. 10, 2017

(65) Prior Publication Data
US 2019/0054400 A1    Feb. 21, 2019

Related U.S. Application Data

(60) Provisional application No. 62/291,219, filed on Feb. 4, 2016.

(51) Int. Cl.
*B01D 33/15*    (2006.01)
*B01D 33/46*    (2006.01)
(Continued)

(52) U.S. Cl.
CPC .......... *B01D 33/15* (2013.01); *B01D 33/466* (2013.01); *B01D 33/60* (2013.01); *B01D 33/72* (2013.01);
(Continued)

(58) Field of Classification Search
CPC ...... B01D 33/15; B01D 33/46; B01D 33/466; B01D 33/72; B01D 33/76; B01D 33/17; B01D 33/806
See application file for complete search history.

(56) References Cited

U.S. PATENT DOCUMENTS 1,963,616 A    6/1934  Fischer
2,042,308 A *  5/1936  Hardy .................. B01D 33/801
                                              210/396

(Continued)

FOREIGN PATENT DOCUMENTS

DE    10 2005 019394 A1    11/2006
WO    WO 2015/000037 A1     1/2015

OTHER PUBLICATIONS

Mascia et al., "End-to-end continuous manufacturing of pharmaceuticals: integrated synthesis, purification, and final dosage formation," *Angewandte Chemie International Edition*, 52(47):12,359-12,363 (2013).

(Continued)

*Primary Examiner* — Benjamin M Kurtz
(74) *Attorney, Agent, or Firm* — Arnold & Porter Kaye Scholer

(57) ABSTRACT

The present disclosure provides for a continuous rotary plate filter apparatus and a method of using the apparatus to separate slurries into liquids and solids. The methods and apparatus are useful for the production of fine chemicals and pharmaceuticals, particularly using Integrated Continuous Manufacturing (ICM), but can also be integrated with other (Continued)

manufacturing processes, such as batch and semi-continuous processes.

16 Claims, 19 Drawing Sheets

(51) Int. Cl.
*B01D 33/60* (2006.01)
*B01D 33/72* (2006.01)
*B01D 33/76* (2006.01)
*B01D 33/80* (2006.01)
*B01D 37/02* (2006.01)

(52) U.S. Cl.
CPC ........... *B01D 33/76* (2013.01); *B01D 33/763* (2013.01); *B01D 33/806* (2013.01); *B01D 37/02* (2013.01)

(56) References Cited

U.S. PATENT DOCUMENTS

| | | | |
|---|---|---|---|
| 2,604,995 A | 7/1952 | Maslin | |
| 2,636,612 A * | 4/1953 | Cording, Jr. et al. | 210/216 |
| 2,716,494 A | 8/1955 | Hursh | |
| 2,798,612 A | 7/1957 | Crumb | |
| 3,138,554 A * | 6/1964 | Klinger | B01D 33/17 210/393 |
| 3,195,484 A | 7/1965 | Clancey et al. | |
| 3,361,262 A | 1/1968 | Orr et al. | |
| 3,416,668 A * | 12/1968 | Lobley | B01D 33/17 210/203 |
| 3,455,821 A | 7/1969 | Aremaa | |
| 3,478,885 A | 11/1969 | Jackson | |
| 3,587,862 A | 6/1971 | Lee | |
| 4,230,575 A | 10/1980 | Lizee | |
| 4,539,114 A | 9/1985 | Mention et al. | |
| 5,021,166 A * | 6/1991 | Torpey | B01D 33/60 210/709 |
| 5,022,991 A | 6/1991 | Day et al. | |
| 6,336,561 B1 | 1/2002 | Kossik et al. | |
| 2004/0251175 A1 | 12/2004 | Adams et al. | |
| 2008/0041242 A1 | 2/2008 | Dendel | |
| 2009/0020469 A1 * | 1/2009 | Pitre | B01D 33/466 210/232 |
| 2009/0308818 A1 | 12/2009 | Laing | |
| 2011/0089122 A1 * | 4/2011 | Smith | B01D 33/04 210/774 |
| 2013/0264284 A1 | 10/2013 | Dixit et al. | |
| 2014/0054232 A1 | 2/2014 | Duttlinger, Jr. et al. | |
| 2015/0283777 A1 | 10/2015 | Dendel et al. | |
| 2016/0250570 A1 * | 9/2016 | Hunt | B01D 37/03 210/105 |

OTHER PUBLICATIONS

Supplementary European Search Report dated Sep. 12, 2019 in European Application No. 17748311.2.
International Search Report issued in International Application No. PCT/US2017/016589 dated Apr. 21, 2017.

* cited by examiner

SCALE 1:1

CONTINUOUS ROTARY PLATE FILTER AND METHODS OF USE THEREOF

REFERENCE TO RELATED APPLICATION

This application is a U.S. National Phase Application of International Application No. PCT/US2017/016589 filed Feb. 3, 2017, which claims the benefit of U.S. Provisional Application No. 62/291,219, filed Feb. 4, 2016, each of which are herein incorporated by reference in their entireties.

FIELD OF THE INVENTION

The present disclosure relates to methods and devices for the continuous filtration of slurries during continuous manufacturing processes, as well semi-continuous and batch manufacturing processes.

BACKGROUND OF THE INVENTION

Integrated Continuous Manufacturing (ICM), consists of a series of unit operations that operate in flow and are integrated into a seamless end-to-end (from synthesis to final product) manufacturing process. ICM represents a shift from the batch manufacturing processes used in the pharmaceutical industry. In contrast to batch manufacturing, ICM's unit operation integration process results in significant operational advantages. ICM significantly reduces manufacturing costs (>50% reduction) and lead times (>90% reduction) has a smaller footprint (~90% reduction) and provides higher quality drugs. These advantages were demonstrated in the first-of-its kind ICM pilot plant (capacity of 1.5 tons of Active Pharmaceutical Ingredient ((API)/year) at MIT, which was able to produce finished coated tablets from raw ingredients through a single, seamless end-to-end process. See Mascia, et al., "End-to-end continuous manufacturing of pharmaceuticals: integrated synthesis, purification, and final dosage formation," *Angewandte Chemie International Edition*, 52(47):12,359-12,363 (2013).

Current pharmaceutical manufacturing consists of unconnected individual steps in large batch units including chemical reactions, filtering, precipitating, drying, milling, and tableting. Quality is evaluated by testing at each step (e.g., quality by testing, QbT). This batch process is plagued by long lead times, geographical dispersion of unit operations, and large manufacturing footprints. It is estimated that more than $50 billion a year is wasted due to inefficient manufacturing. Meanwhile, attempts to improve quality have resulted in increasing numbers of product recalls.

In contrast to the quality by testing approach of the batch manufacturing process, for ICM processes, quality is designed into the system (Quality by Design, QbD). In QbD processes, controllers maintain quality thresholds throughout the production cycle, ensuring that the end product of the entire process meets its quality specification. To create ICM systems, devices and methods for each of the various unit operations need to be developed that can process streams of materials. Further, the unit devices require the ability to adjust to variations in the process stream and to provide feedback to the ICM process controller. The unit devices may include a variety of real-time sensors and Process Analytical Technologies (PATs) that measure different process parameters and send signals to the ICM process controller. Each sensor may operate at a different sampling frequency depending on the type of sensor and the parameter to be measured. A high sampling frequency enables rapid modification of the process in response to unwanted changes in process parameters. The ICM process controller integrates the signals across the unit operations and adjusts the parameters to limit the variation within the product stream. Current unit devices, designed to be used in batch mode are generally incompatible with ICM processes, operate at inappropriate scales, and do not provide for real time control.

There is a need for the development of unit operation processes and devices that can be incorporated into ICM methods. The present disclosure relates to and is directed to methods and devices for the filtration of slurries. The slurries may comprise a solid intermediate product or final API suspended in a liquid. In some aspects, the slurries may comprise a solid intermediate product or final API suspended in a liquid comprising one or more bi-products in solution. In other aspects, the slurries may comprise a solution of an intermediate product or final API dissolved in a liquid comprising one or more solids in suspension. Alternatively the slurries may comprise a solution of an intermediate product or final API dissolved in a liquid comprising one or more solid bi-products in suspension. The continuous filtration apparatus of the present disclosure is designed to accept a continuous stream of input slurry and output a continuous stream of an intermediate product or final API in the form of a solid filter cake or a liquid filtrate.

There exists a number of U.S. patents directed to filtration apparatus including U.S. Pat. No. 1,963,616 issued to Fischer on Jun. 19, 1934; U.S. Pat. No. 2,716,494 issued to Hursh on Aug. 30, 1955; U.S. Pat. No. 3,195,484 issued to Clancy et al. on Jul. 20, 1965; U.S. Pat. No. 3,361,262 issued to Orr et al. on Jan. 2, 1968; U.S. Pat. No. 3,478,885 issued to Jackson on Nov. 18, 1969; U.S. Pat. No. 4,230,575 issued to Lizée on Oct. 28, 1980; U.S. Pat. No. 4,539,114 issued to Mention et al. on Sep. 3, 1985; U.S. Pat. No. 6,336,561 issued to Kossik et al. on Jan. 8, 2002; United State Patent Application Number 2013/0264284, to Dixit et al., published on Oct. 10, 2013. The configurations shown in these patents typically were created to optimize high production rates, to provide long service life, and with minimal concern about product loss due to retention of the product in the filters.

During the development and manufacture of pharmaceuticals, the need to filter slurries containing an intermediate product or API, either in solution or in suspension, occurs regularly. Traditionally, solid-liquid separation for batch processing has been carried out using centrifuges, gravity filtration, vacuum filtration, and/or pressure filtration equipment. Although such equipment has been used for years, there are inherent disadvantages to its use, especially when employed in laboratory, pilot plant, or other small volume applications where time and resources are limited, and for processes in which it is critical that the materials be isolated from the outside environment.

For example, centrifuges are often relatively expensive, require significant maintenance, and are labor intensive to operate under aseptic or "clean" conditions. Other types of conventional batch type filtration equipment can also be expensive and similarly require a high degree of operator attendance. A further inherent problem with prior art batch filtration units is that the designs of small batch volume filtration units are often radically different than the designs of larger batch volume equipment, making the results of scaling up from laboratory or pilot plant volume production to industrial scale production less predictable.

An additional drawback with the use of centrifuges and other batch filtration units in the laboratory and pilot plant environments is that cleaning these units between batches requires considerable time and labor. Frequently, time and technical manpower resources in laboratory and pilot plant environments are at a premium, and such cleaning operations can become an unacceptable bottleneck. These cleaning operations also introduce an element of risk, both in terms of exposing personnel to potentially hazardous materials, and in terms of introducing contaminants into the processing equipment that may degrade the quality of, or even completely ruin, the next batch to be processed. Thus, it is desirable to provide efficient means to separate solids and liquids that is usable in continuous processing, and which does not require time consuming cleaning procedures between processing batches.

A variety of approaches have been developed for continuous solid-liquid separations, including continuous conveyor belt filters; automated, alternating agitated batch filters; continuous rotary drum filters; continuous horizontal rotary filters; and continuous horizontal rotary filter arrays, which may be used under reduced pressure, and with filter cake thickness controllers, such as blades and compartmentalized feed-distribution boxes.

A common device used for solid-liquid phase separation for continuous flow processing is the rotary filtration unit. In fact, the rotary vacuum filter is considered to be a workhorse of the chemical process industry. In this type of filter, a slurry is pumped onto a plate which rotates slowly at only a few revolutions per minute (rpm). Solids adhere to the top surface of the plate, which may be coated to aid in the collection of the solids. The slow rotational speed of the plate, as well as air flow over the portion of the plate that contains material, helps to dry the solids adhering to the plate. This solid filtrate is then removed from the rotating plate, often by a blade that scrapes the collected solids from the plate. While efficient, such units are generally quite large and expensive (larger than is necessary for the pharmaceutical industry), typically do not have washing functions (for cake and plate), and usually operate at much thicker cake heights without the same quality systems required by the pharmaceutical industry. The large footprints typical of conventional filters largely precludes their use in compact continuous production systems. Consequently, they have been used primarily in association with large-scale continuous flow processing, such as for wastewater treatment. In view of the operating efficiencies of this type of device, it would be desirable to provide a much smaller and substantially lower cost filtration unit that operates according to the principles of rotary plate filtration, but which can be used for batch or continuous processing in place of the traditional centrifuges and other batch filtering units.

Typical conventional rotary plate filters do not provide these desirable features. Prior art rotary plate filters are relatively complicated mechanical constructions and not readily adaptable to be produced with the quality required for use in pharmaceutical applications. Specifically, prior art rotary plate filters often include complicated valves to control pressure in the system to ensure the proper flow of fluid into the filter unit. Because of the relatively large size of prior art rotary drum filters, and the fact that such units are designed to have very substantial service lives, such units have often incorporated relatively expensive bearing and seal components. It would be desirable to provide a rotary plate filter that replaces these mechanically complicated pressure control schemes in the prior art with control means that are similarly effective, yet much simpler, lower cost, and more appropriate for a continuous unit. It would further be desirable to provide a rotary plate filter that does not require expensive bearing and seal components.

There are filters that are currently used in industry. For example, a Nutsche filter (e.g. MAVAZWAG®, Mavag AG, Neunkirch, Switzerland) is the industrial version of the well known laboratory scale Buchner funnel except that it is designed to operate under either on vacuum or pressure. These are large units that require personnel to remove the resultant cake creating a safety risk due to personnel exposure and also the potential for quality infractions. Further, Nutsche filters operate only in batch mode and have a minimum filter pore size of 10 microns ($\mu$m) which can result in significant product loss through the filter. Continuous filters in use in industry include the vacuum drum filter by Steadfast Equipment (U.S. Pat. No. 6,336,561). This apparatus is designed for aquatic remediation, and has been extended to other aqueous filtrations. However, it has several limitations making it unsuitable for use in most pharmaceutical applications. First it is a disposable injection-molded plastic construction, making it incompatible with organic solvents. Second, it is not cGMP-compliant. Third, the filter material (polypropylene) has a pore size of 7-30 $\mu$m, resulting in significant product loss through the filter. Finally the device does not allow for in-line filter cake or filter plate washing.

A continuous rotary filter was developed at the Novartis-MIT Center for Continuous Manufacturing. This unit operation was very effective operating at a throughput of ~100 g/h. There were significant advantages over current filters, including a smaller footprint, continuous operations at low throughput, and a much thinner filter cake (<1/10 that of a conventional unit) with more precisely controlled dimensions, which resulted in better purity, cleaning, washing, and filtering. The apparatus also included multiple filter cake washing points, and less solvent was required for cleaning making it more efficient. The performance of the rotary filter was satisfactory during testing, and it was easily integrated with other continuous unit operations at the Novartis-MIT Center.

However, there were areas that required improvement: (i) active control of the filter cake thickness and its distribution, (ii) homogenous distribution of the washing solvent, and (iii) overall robustness of the unit. The distributor that spreads the slurry across the filter plate was oriented perpendicularly relative to the filter plate (i.e. 90° vs. the filter plate). However, variation in the cohesive properties of the slurry often prevented an even distribution across the filter plate. Moreover, the distributor propagated the material to the rim of the continuous filter where some fell off the unit thereby reducing the yield. The filter cake wash was performed by flowing solvent through four ports on one of the arcing radii of the unit's frame. The solvent was dripped onto the filter cake, but was not sufficiently applied along the entire radius of the filter plate (i.e. it was not evenly spread over wet-cake). In addition, the filter cake was collected using an auger operating in the centrifugal direction, which resulted in significant loss of material and an even lower yield. Furthermore, the apparatus used a fixed filter plate, which was welded into the device. The filter medium itself was comprised of porous 316 stainless steel sheet, procured from the Mott Corporation (Part #1100-10-12-.047-0.5-A SHEET 316LSS). The pore size was 0.5 $\mu$M, which was determined to be the most effective size at passing unwanted contaminants and solvents through, while preventing API crystals to pass through or become lodged within the pores. As such, the filter plate could not easily be changed if a filter having different properties, (e.g., pore size, chemical compatibility, etc.) was required for a particular process.

Accordingly there exists a need to provide a continuous filtration system for incorporation into ICM processes (as well as with semi-continuous or batch manufacturing processes) that could be sufficiently robust to run continuously for at least one day, and be adjusted to accommodate changes in slurry input, changes in concentrations, and other variations inherent in a continuous process. The system further needed to be capable of performing filtrations at elevated temperatures and/or with filter aids. Furthermore, interchangeable modular filter plates would allow for different pore sizes and filter media. It was also desirable to develop a continuous filter having a small footprint so that it could be moved and adapted to different continuous production processes, or other manufacturing processes such as semi-continuous or batch, and could be isolated within an appropriate containment system, such as a fume hood. The present disclosure further provides for real-time monitoring of process parameters including the filter cake dimensions, plate rotational rate, auger speed, and impurities in the filter cake. It was further desirable to replace the often complicated, adjustable-position metallic sharp edge of prior art rotary plate filters with a simpler adjustable-position scraper to remove solids from the plate. To address the requirement for cleaning, a self-cleaning mechanism has been incorporated such that the same unit could be used for the continuous processing of material. Finally, the apparatus of the present disclosure provides for improved efficiency through better control of the wash-to-cake height ratio, more even distribution of wash solvent, and filter cake collection with minimal loss of material, thus improving yield, safety, and environmental sustainability.

SUMMARY OF THE INVENTION

The present disclosure comprises, in one form thereof, an apparatus for continuously processing a slurry comprising: a housing (1601, 1602, 1603, 1605, 1606); feed and solvent wash assembly (1300); a removable, rotatable filter plate (1101) having a porous surface for receiving the slurry from the feed and solvent wash assembly (1300); a rotatable inner plate supporting the filter plate (1101); an inner plate rotator for rotating the inner plate; a filtrate outlet (1107) in fluid communication with the filter plate (1101) adapted to convey the filtrate from the housing (1601, 1602, 1603, 1605, 1606); a scraper (1403) for removing a solid filter cake from the filter plate (1101); and a filter cake outlet (1102) adapted to convey the filter cake from the housing.

In another form, the present disclosure includes a method for continuously filtering a stream of slurry using an apparatus comprising: a housing (1601, 1602, 1603, 1605, 1606); feed and solvent wash assembly (1300); a removable, rotatable filter plate (1101) having a porous surface for receiving the slurry from the feed and solvent wash assembly (1300); a rotatable inner plate supporting the filter plate (1101); an inner plate rotator for rotating the inner plate; a filtrate outlet (1107) in fluid communication with the filter plate (1101) adapted to convey the filtrate from the housing (1601, 1602, 1603, 1605, 1606); a scraper (1403) for removing a solid filter cake from the filter plate (1101); and a filter cake outlet (1102) adapted to convey the filter cake from the housing (1601, 1602, 1603, 1605, 1606). The method comprises the steps of a) providing a slurry to the slurry feed block (1301); b) rotating the filter plate (1101); c) filtering the slurry through the filter plate (1101) to form a filtrate and a solid filter cake; d) passing the filtrate through the filtrate outlet (1107); e) removing the filter cake from the filter plate (1101); and f) passing the filter cake through the filter cake outlet (1102).

BRIEF DESCRIPTION OF THE DRAWINGS

The present disclosure is disclosed with reference to the accompanying drawings, wherein.

Corresponding reference characters indicate corresponding parts throughout the several views. The examples set out herein illustrates several aspects of the present disclosure but should not be construed as limiting the scope of the present disclosure in any manner.

DETAILED DESCRIPTION

Figure 1:
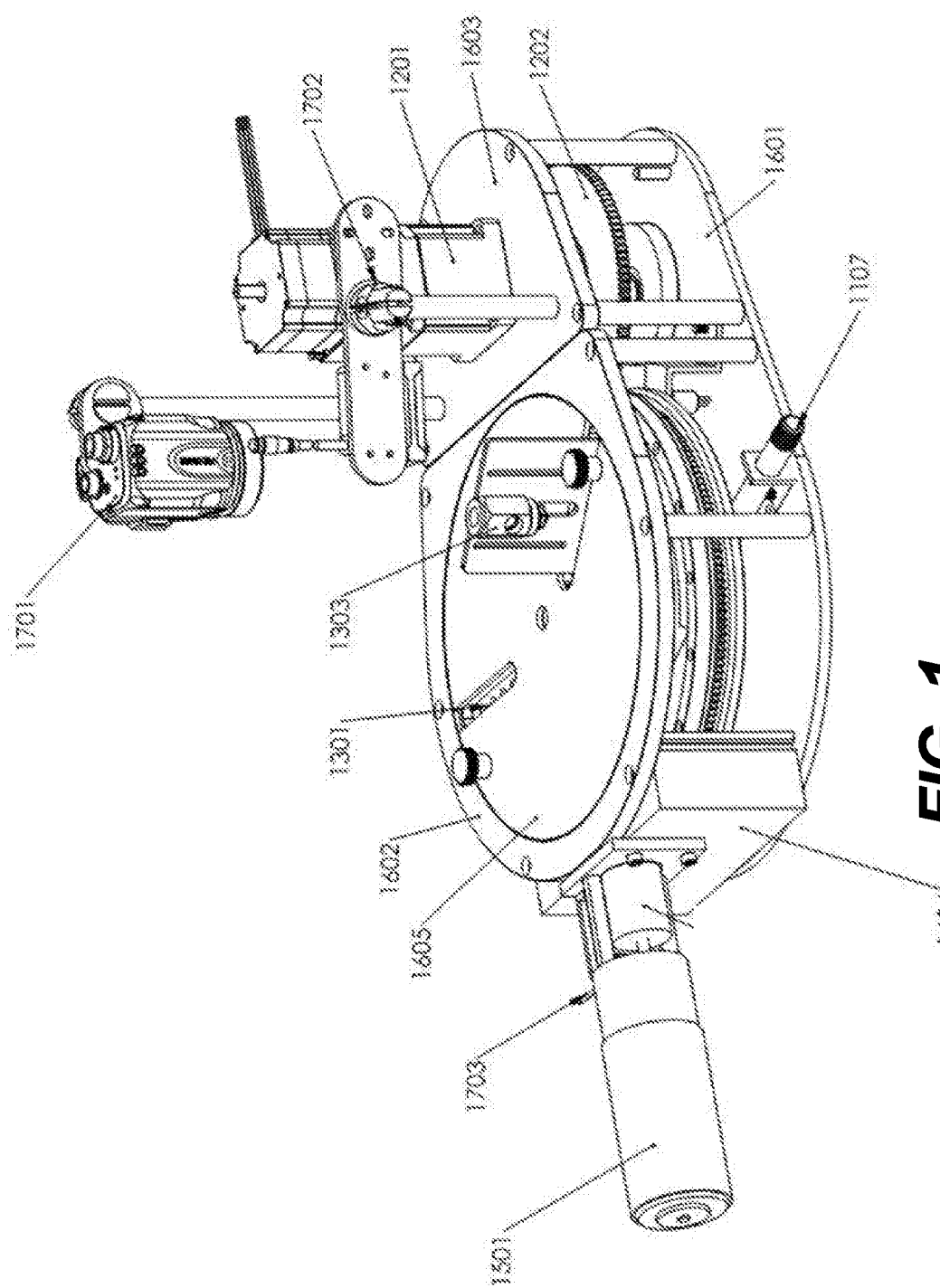
FIG. 1 depicts a front view of an exemplary continuous rotary plate filter apparatus comprising an auger motor (1501), auger speed sensors (1703), an auger motor mount (1604), a removable lid (1605), a filter top plate (1602), a slurry feed block (1301), a filter cake washer spray nozzle (1303), a vision system camera (1701), a cake thickness measuring laser sensor (1702), an inner plate rotator motor (1201), an inner plate rotator motor top plate (1603), an inner plate rotator gear (1202), a bottom plate (1601), and a filtrate outlet (1107).

The present disclosure provides for, and includes a continuous filtering apparatus capable of continuously filtering a stream of intermediate product, final product, as well as API. In certain aspects, a continuous process is necessary because reactions and other processes often occur in the liquid phase and the API or intermediate product, either as a solid or in solution, must be prepared for subsequent processing steps. In other aspects, a continuous filtering apparatus according to the present disclosure provides for real-time control of a filtering process and can improve the efficiency of product development. Generally, before certain steps in a manufacturing process can occur, such as a synthetic or formulation step, a slurry must be filtered to provide either a solid with minimal liquid content, or a solution with minimal solid content. In addition, impurities often need to be removed to meet pharmaceutical specifications. This is a very common function in the drug production cycle.

The present disclosure is generally directed to rotary plate filters, and more specifically, to self-cleaning rotary plate filters for continuous processing. The continuous filtering apparatus of the present disclosure offers significant advantages over previous filtering unit operations. First, the present apparatus has a significantly smaller footprint (less than 10,000 centimeters ($cm^2$) making it suitable for placing in a fume hood or other safety containment. It also provides for a mobile and configurable filtering system that can be readily incorporated into a continuous process or other type of manufacturing process (e.g. semi-continuous and batch processes). Second, the apparatus is capable of continuous operation, incorporates a number of sensors, and is able to adjust parameters such as rotation speed, auger speed, pressure, and flow rate in real time. The apparatus is further capable of accommodating low (and variable) throughputs; the range of throughputs is approximately 1 wt % solid to 80 wt % solid and is therefore easily integrated with other continuous unit operations (and semi-continuous and batch unit operations as well) without significant modification. Third, the operation may be performed with a much shorter residence time (approximately 3 seconds), which decreases breakdown and agglomeration of solid products. Fourth, the apparatus includes a new discharging system for the filter cake, by which the filtered material may be discharged centripetally, rather than centrifugally, resulting in higher yields. Fifth, the apparatus evenly distributes the slurry on the rotating filter plate, a process which may be monitored by a camera (e.g., Keyence IV-500CA). The camera also allows for accurate measurement of the filter cake width. Sixth, a laser sensor (e.g., Keyence IL-1000) and a pneumatic spray nozzle may be included in the apparatus, allowing for measurement of the thickness of the filter cake in real-time and more effective washing of the filter cake to remove impurities via better distribution of the wash. Seventh, the apparatus may include a clean-in-place mechanism to wash the filter surface and clear any clogged pores. Eighth, the apparatus uses easily interchangeable filter plates fabricated from a suitable material (e.g., porous stainless steel) with different pore sizes (e.g., 0.5, 1.0, 2.0 and 5.0 μm), where selection of the appropriate plate is based on (e.g., product particle size). Ninth, the filter plate may be recessed relative to the rim (e.g., by 5 mm depth) creating a lip enclosing the filter plate. Furthermore, the slurry distributor may be oriented other than perpendicularly relative to the filter plate (e.g., at <45 degrees relative to the filter plate). These improvements allow the slurry to be spread more evenly onto the filter plate, preventing the material from being propagated to the edge of the filter and off of the unit. The performance of the slurry distributor may be assessed by measuring the filter cake thickness, and correlating this measurement with the slurry mass flow rate and filter plate rotational speed (residence time). In addition, the entire system may be fully constructed using materials consistent with the FDA's cGMP guidance on manufacturing. Moreover, it may also be integrated with a control system (e.g., LabVIEW by National Instruments).

The continuous filtering apparatus of the present disclosure incorporates one or more of a number of features. In an aspect the continuous rotary plate filter apparatus includes a housing within which is located a slurry inlet adapted to receive a slurry onto the filter plate, a gas inlet adapted to receive gas into the housing, solvent inlets adapted to wash the filter cake and the filter plate, a filtrate outlet adapted to convey filtrate from the housing after the filtrate has been separated from the filter cake, and a filter cake outlet adapted to convey the filter cake from the housing. A supporting inner plate is mounted within the housing. In addition, a removable filter plate is located on the support plate, which extends over the inner support plate and is disposed within the housing such that the filter is secured onto the inner support plate. The filter is adapted to receive a slurry that is deposited on the top surface of the filter as filtrate separated from the filter cake is drawn through the filter and out the filtrate outlet. A portion of the frame provides fluid communication between an interior surface of the filter and the filtrate outlet and is thereby adapted to convey the filtrate from the inner plate after the filtrate has passed through said filter. A gear is connected to the frame and is adapted to be coupled to a motor. This gear rotates the inner plate, enabling the incoming slurry feed to be deposited onto a clean filter plate, in addition to exposing the filter cake deposited on the filter to gas that is drawn through the filter into the inner plate from inside the housing, as well as enabling the conveyance of the filter cake towards the auger. This flow of gas through the filter cake at least partially dries it. Also included within the device is a scraper for removing at least a portion of the filter cake deposited on said filter after the filter cake has been at least partially dried by the gas. The filter cake that is thus removed passes through a filter cake outlet.

Referring to the Figures, there are shown generalized schematics of a continuous rotary plate filter according to aspects of the present disclosure. A continuous rotary plate filter apparatus is an apparatus that can accommodate a continuous flow of a slurry, provide for filtering to a desired level of purity, and provides for the removal of the filter cake and the filtrate. As used herein, a continuous rotary plate filter apparatus can run continuously for minutes, hours, a day, a week, months, or years. Selection of appropriate time lengths for operations depend on the throughput requirements of the specific intermediate or drug substance. Preferably, such a batch filtration rotary plate filter should be capable of running continuously, in a steady state fashion for a period of time sufficient to process a batch of product, enabling the device to be very small as compared to conventional types of batch equipment that would normally be employed to handle the same amount of material. It would also be desirable to provide a unit that is enclosed, to minimize the risk of product and personnel contamination. It would further be desirable to fabricate such a unit from materials that can be sterilized if a process requires that sterile equipment be used. An in-line clean-in-place mechanism offers the advantages of addressing clean up, containing any hazardous materials used within the device, reducing the chances of product contamination, and enhancing reliability and reproducibility.

The present disclosure provides for, and includes, an apparatus for continuously processing a slurry including one or more of the following features: a housing; a slurry feed block (1301); a removable, rotatable filter plate (1101) having a porous surface for receiving the slurry from the slurry feed block (1301); a rotatable inner plate supporting the filter plate (1101); an inner plate rotator for rotating the inner plate; a slurry wash block (1305); a filtrate outlet (1107) in fluid communication with the filter plate (1101) adapted to convey a filtrate from the housing; a scraper (1403) for removing a solid filter cake from the filter plate (1101); and a filter cake outlet (1102) adapted to convey the filter cake from the housing. As provided herein, a continuous rotary plate filter of may include one or more wash solvent blocks (1305) to provide for washing the cake with one or more solvents. Also included and provided for are one or more wash solvent blocks (1302) to wash the rotatable filter plate (1101) after removal of the cake. In certain aspects, wash solvent block (1302) may provide for a solvent to dissolve and remove residual solid cake to ensure that the rotatable filter plate (1101) is restored to its full capacity and to prevent clogging.

Also provided for, and included, in the present disclosure are components for controlling the temperature of the incoming slurry, the rotatable filter plate (1101) and housing and the solvent lines for the wash solvent blocks (1302) and wash solvent blocks (1305). In certain aspects, the lines and components of the apparatuses are insulated to prevent heating by the ambient environment. As will be appreciated by one or ordinary skill in the art, a frequent step during manufacture is crystallization of products from solution, typically under low temperature conditions. Maintaining a low temperature during downstream processing events ensures maximal recovery of the precipitated product. The present apparatus provides for and includes for temperature control of the components of the slurry feed and solvent wash assembly (1300) including, but not limited to, a slurry feed block (1301), wash solvent block (1302), and slurry wash block (1305). In certain aspects, it may be desirable to provide for a heated wash solvent block (1302) to dissolve and remove solids on the rotatable filter plate (1101) to ensure consistent filtering capacity in the continuous system. Suitable temperature control methods are known in the art including, but not limited to a pumped coolant liquid, insulation, and Peltier type systems. As appropriate, the system may also be heated using resistance heating.

The device includes an outer housing in which a filter plate supported by an inner plate can rotate. Preferably, the device is fabricated from a material that can be sterilized.

In aspects according to the present disclosure, the continuous rotary plate filter apparatus comprises a housing. In aspects according to the present disclosure, the housing is opaque, translucent, or transparent. In aspects according to the present disclosure, the housing comprises a bottom plate (1601). In aspects according to the present disclosure, the housing comprises a filter top plate (1602). In aspects according to the present disclosure, the housing comprises an inner plate rotator motor top plate (1603). In aspects according to the present disclosure, the housing comprises a removable lid (1605). In certain aspects, the lid (1605 may be transparent. In other aspect, the lid (1605) may be made of glass. In aspects according to the present disclosure, the housing comprises and a side panel (1606).

Figure 3A:
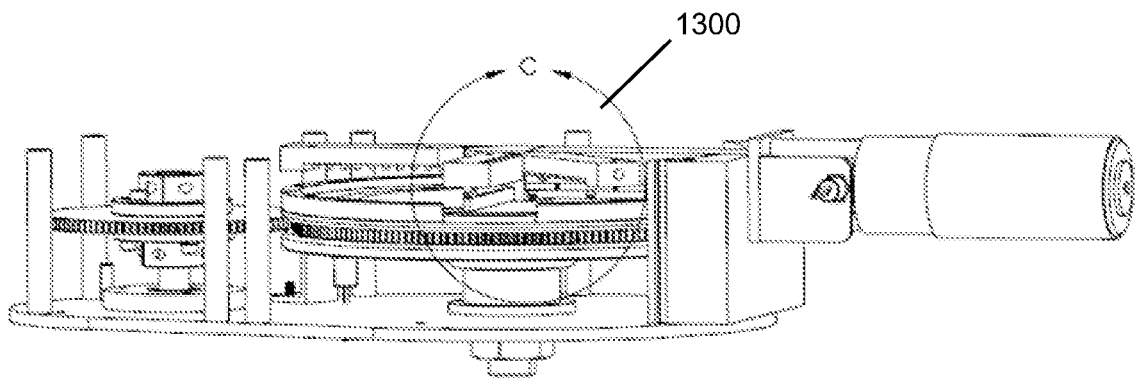
FIGS. 3A and 3B depict an expanded (3A) and cut-away rear view (3B) of an exemplary continuous rotary plate filter apparatus, showing a slurry feed block (1301), a slurry distributor (1304), a wash solvent block (1302), and a slurry wash block (1305) of a slurry feed and solvent wash assembly (1300; represented as region "C" in FIG. 3A).
Figure 3B:
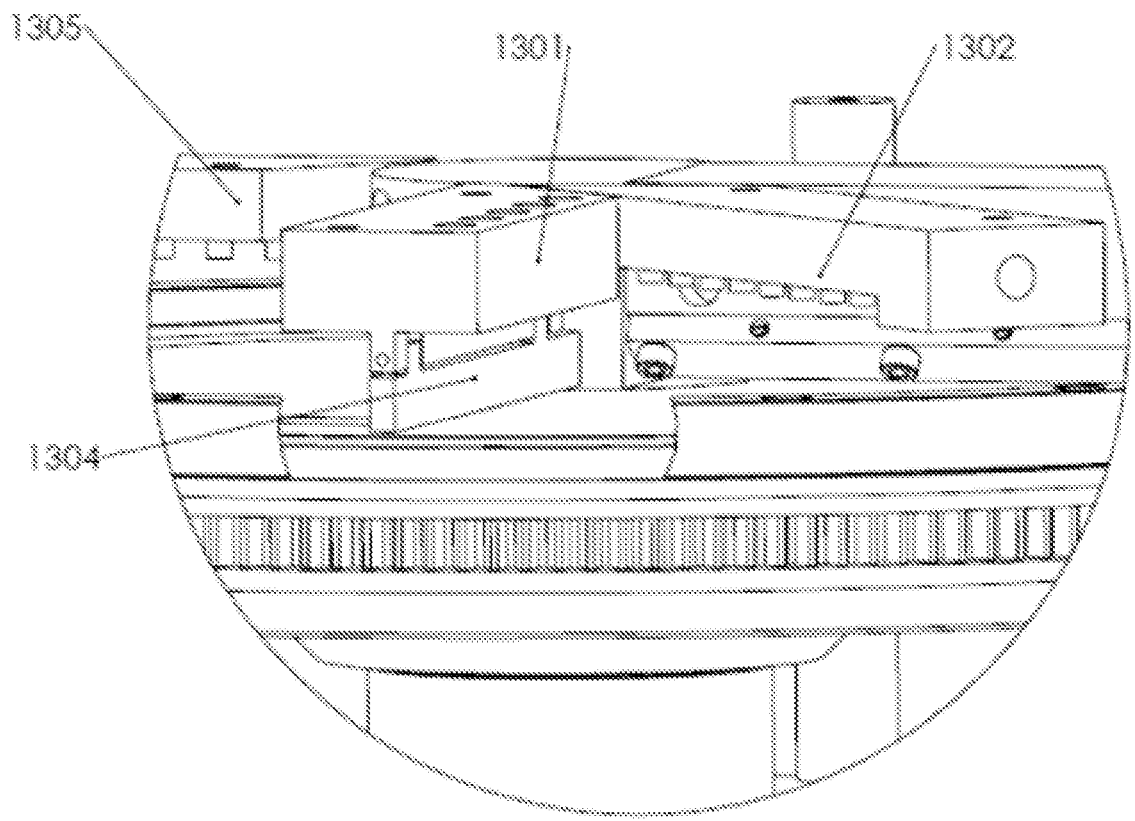
Figure 4A:
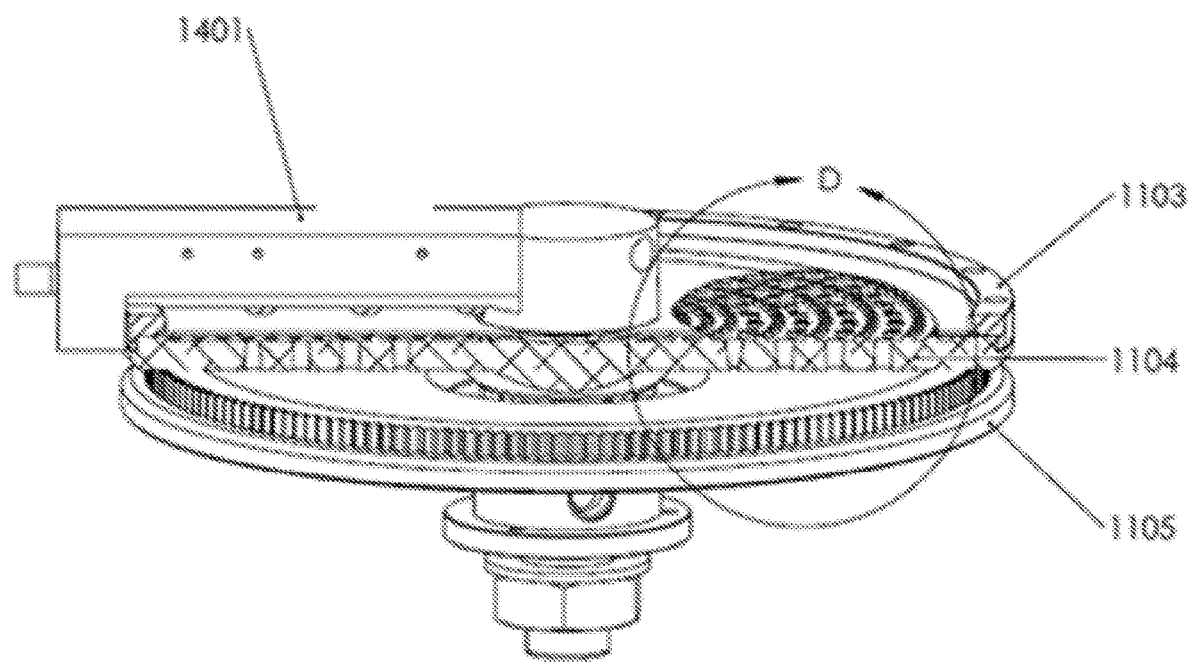
FIGS. 4A and 4B depict an expanded (4A) and cut-away front view (4B) of an exemplary continuous rotary plate filter apparatus, showing an auger housing (1401) and a porous filter plate (1101), which is secured by a filter plate retaining ring (1103) onto a filter support plate (1104). The filter support plate (1104) rests upon a bottom vacuum plate (1105).
Figure 4B:
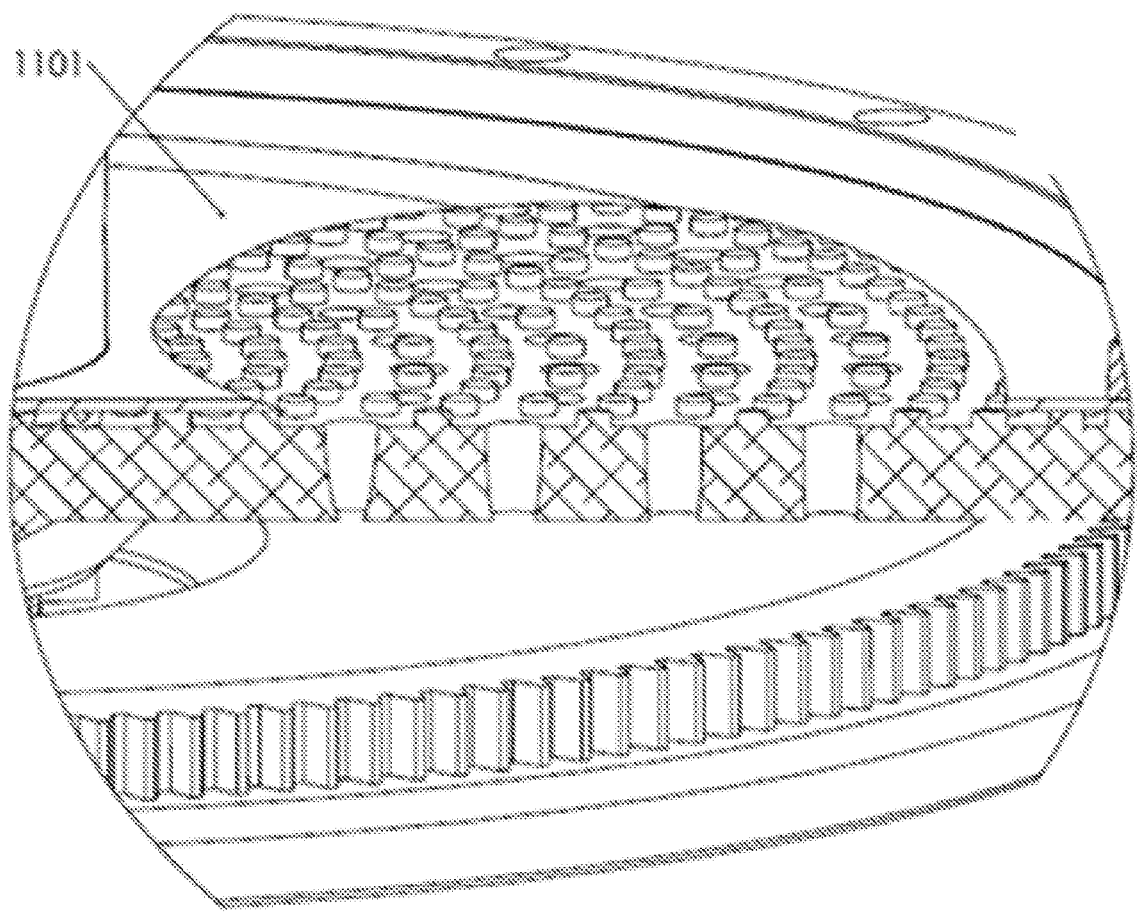

In aspects according to the present disclosure, the continuous rotary plate filter apparatus comprises a slurry feed and solvent wash assembly (1300) having a slurry feed block (1301) (FIG. 3B). As shown in FIG. 3B, slurry feed block (1301) includes five inlets and outlets to distributed a slurry from a slurry line (1306) that conveys a slurry from an outlet of a slurry pump. In an aspect, slurry feed block (1301) comprises a single inlet for a slurry line (1306) and a manifold to distribute the incoming slurry across the radius of the rotatable filter plate (1101). In other aspects and as appropriate in view of the physical properties of the incoming slurry, slurry feed block (1301) includes two or more inlets for a slurry line (1306). For example, an incoming slurry that retains liquid may flow and spread across the radius of rotatable filter plate (1101) when deposited as a single stream. In other aspects, multiple streams may be required to provide for an even deposition of the incoming slurry to the rotatable filter plate (1101). Not to be limited by theory, the filtration rate of small granular particles is sufficiently low that the slurry can be easily spread before drying into a cake and a slurry feed block (1301) as shown in FIG. 3B can be accommodated. In an aspect, the slurry feed and solvent wash assembly (1300) includes a slurry feed block (1301) and a slurry distributor (1304) to spread the incoming slurry across the radius of rotatable filter plate (1101). In an aspect, the assembly (1300) further includes a slurry wash block (1305) following the slurry feed block (1301) for washing the deposited slurry with a slurry wash solvent. The present disclosure further provides for an assembly having a wash solvent block (1305) to wash the cake with either the slurry liquid or with a wash solvent. Also included and provided for is an assembly (1300) having both a wash solvent block (1305) and a slurry wash block (1305). Additional wash blocks (1302) and (1305) are included in the assembly 1300 of the present disclosure to provide any number of additional wash steps using solvents and liquids as appropriate, only limited by the design needs of the system to limit losses of the collected solid. As will be discussed below, the assembly (1300) and other assemblies of the continuous filtration apparatus of the present disclosure may further comprise components for controlling the temperature. As will be recognized by one of ordinary skill in the art, solubility is significantly affected by temperature with lower temperatures favoring the formation of precipitates and solids. In aspects according to the present disclosure, the slurry feed block (1301) is located at the top of the housing. In aspects according to the present disclosure, the slurry feed block (1301) is located on the side of the housing. In aspects according to the present disclosure, the slurry feed block (1301) is adapted to couple to a slurry line (1306) that conveys the slurry from an outlet of a slurry pump. In aspects according to the present disclosure, the slurry feed block is located at the top of the housing and adapted to couple to a slurry line that conveys the slurry from an outlet of a slurry pump. In aspects according to the present disclosure, the continuous rotary plate filter apparatus further comprises a slurry flow meter for measuring a rate of flow of the slurry from the slurry feed block (1301). In aspects according to the present disclosure, the continuous rotary plate filter apparatus further comprises a slurry inlet valve, and a slurry inlet valve controller.

Another non-limiting example of a oscillating slurry feed and solvent wash assembly (1300) is illustrated in FIG. 15. As shown in FIG. 15A-C, a slurry feed and solvent wash assembly (1300) comprises an oscillating deposition tube (1310) that continuously distributes the incoming slurry from a slurry line (1306) along the radius of the rotating filter plate (1101). As shown, an oscillating slurry feed assembly can be attached to top plate 1602 by mounting plate (1316). As shown, an oscillating deposition tube (1310) is connected to a rotatable arm (1311) having a cam translating follower (1313) in contact with a rotating cam (1312) having a base radius ($r_b$) and a primer radius ($r_p$). Rotating cam (1312) is connected to motor (1314). As illustrated in FIG. 15D, an oscillation cycle begins with the follower (1313) at distance $r_b$ which positions deposition tube (1310) towards the center of the rotating filter plant 1101. As cam (1312) rotates, the follower travels to distance $r_p$ and the rotatable arm (1311) positions deposition tube (1310) to towards the outer edge of the rotating filter plate (1311) as shown in FIG. 15E. Spring (1315) provides suitable tension to return the rotatable arm (1311) to a resting position as shown in FIG. 15E. As will be recognized by those of ordinary skill in the art, the shape and rotation speed of cam (1312), the distances rp and rb, the configuration of rotatable arm (1311), and the filter plate size and rotation speed can be adjusted as appropriate to the physical properties of the slurry. It will be apparent to one of ordinary skill in the art, that a linear actuator may be substituted for the cam/follower system to provide for an oscillating motion of a deposition tube (1310). In other aspect, the rotation of rotatable arm (1311) may be provided directly by a motor driven by a suitable oscillating current. In an aspect, the deposition tube may be configured from the top of the housing or from the side. Like the assembly (1300) having a slurry feed block (1301), the apparatus may further comprise a slurry flow meter for measuring a rate of flow of the slurry from the slurry line (1306). In aspects according to the present disclosure, the continuous rotary plate filter apparatus having a oscillating deposition tube (1310) may further comprise a slurry inlet valve, and a slurry inlet valve controller.

In aspects according to the present disclosure, the continuous rotary plate filter apparatus comprises a removable, rotatable filter plate (1101) having a porous surface for receiving a slurry from the slurry feed block (1301). The porous surface comprises a plurality of openings sized to enable the filtrate to pass through. However, the openings are sized to block passage of the solids comprising the filter cake.

The filter plate may be fabricated from regulatory-compliant and relatively chemically inert materials, such as stainless steel, nickel-based alloys (e.g., INCONEL®, HASTELLOY®), borosilicate glass (e.g., PYREX®), and combinations thereof. In other aspects, filter plates may be fabricated by using a suitable polymer. In aspects according to the present disclosure, the filter plate (1101) is fabricated from porous metal material, whose openings are similarly sized to block passage of the solids.

In aspects according to the present disclosure, the porous surface has a pore size D90 of 0.01 microns (μm) to 100 μm. In aspects according to the present disclosure, the porous surface has a pore size D90 of 0.1 μm to 100 μm. In aspects according to the present disclosure, the porous surface has a pore size D90 of 1 μm to 100 μm. In aspects according to the present disclosure, the porous surface has a pore size D90 of 10 μm to 100 μm. In aspects according to the present disclosure, the porous surface has a pore size D90 of 0.01 μm to 10 μm. In aspects according to the present disclosure, the porous surface has a pore size D90 of 0.1 μm to 10 μm. In aspects according to the present disclosure, the porous surface has a pore size D90 of 1 μm to 10 μm. In aspects according to the present disclosure, the porous surface has a pore size D90 of 0.01 μm to 1 μm. In aspects according to the present disclosure, the porous surface has a pore size D90 of 0.1 μm to 1 μm. In aspects according to the present disclosure, the porous surface has a pore size D90 of 0.01 μm to 0.1 μm. In aspects according to the present disclosure, the porous surface is uniformly porous. The term "pore size D90" refers to the value of the pore size distribution such that 90% of the pores have a diameter equal to or smaller than the value. The term "uniformly porous" refers to a pore size distribution such that all pores have similar dimensions and are similarly distributed around the plate.

In aspects according to the present disclosure, the filter plate (1101) further comprises a filtration aid. In aspects according to the present disclosure, the filtration aid is selected from the group consisting of silica gel, functionalized silica gel, diatomaceous earth, alumina, aluminosilicates, and combinations thereof. In aspects according to the present disclosure, the filtration aid comprises silica gel. In aspects according to the present disclosure, the filtration aid comprises diatomaceous earth. In aspects according to the present disclosure, the filtration aid comprises alumina. In aspects according to the present disclosure, the filtration aid comprises aluminosilicates. In aspects according to the present disclosure, the filtration aid comprises a combination of functionalized silica gel and diatomaceous earth.

In aspects according to the present disclosure, the filter plate (1101) further comprises a coating. In aspects according to the present disclosure, the coating promotes adhesion of solids from the slurry to the filter plate (1101). In aspects according to the present disclosure, the coating prevents adhesion of solids from the slurry to the filter plate (1101).

In aspects according to the present disclosure, the coating prevents corrosion of the filter plate (1101). In aspects according to the present disclosure, the coating prevents solvation of the filter plate (1101) by liquids from the slurry. In aspects according to the present disclosure, the coating is selected from the group consisting of hydrophilic coatings, hydrophobic coatings, anti-corrosion coatings, and combinations thereof. In aspects according to the present disclosure, the coating comprises a hydrophilic coating. In aspects according to the present disclosure, the coating comprises a hydrophobic coating. In aspects according to the present disclosure, the coating comprises an anti-corrosion coating. In aspects according to the present disclosure, the coating comprises a combination of a hydrophobic coating and an anti-corrosion coating.

In aspects according to the present disclosure, the continuous rotary plate filter apparatus comprises a slurry distributor (1304) that homogeneously distributes the slurry over the surface of the filter plate (1101). The slurry distributor (1304) may be designed to distribute the slurry such that the slurry will cover the entire surface area of the filter cake, and not only parts of it. In aspects according to the present disclosure, the slurry distributor (1304) is at a fixed distance from the filter plate (1101). In aspects according to the present disclosure, the slurry distributor (1304) is adjustable to control the thickness of the filter cake. In aspects according to the present disclosure, the slurry distributor (1304) is adjustable to a distance from the filter plate (1101) of 0.2 mm to 25 mm. In aspects according to the present disclosure, the slurry distributor (1304) is adjustable to a distance from the filter plate (1101) of 0.2 mm to 5 mm. In aspects according to the present disclosure, the slurry distributor (1304) is adjustable to a distance from the filter plate (1101) of 0.2 mm to 1 mm. In aspects according to the present disclosure, the slurry distributor (1304) is adjustable to a distance from the filter plate (1101) of 1 mm to 25 mm. In aspects according to the present disclosure, the slurry distributor (1304) is adjustable to a distance from the filter plate (1101) of 1 mm to 5 mm. In aspects according to the present disclosure, the slurry distributor (1304) is adjustable to a distance from the filter plate (1101) of 5 mm to 25 mm. In aspects according to the present disclosure, the slurry distributor (1304) is adjustable to a distance from the filter plate (1101) of 5 mm to 10 mm. In aspects according to the present disclosure, the slurry distributor (1304) is adjustable to a distance from the filter plate (1101) of 10 mm to 25 mm. In aspects according to the present disclosure, the slurry distributor height may be actively controlled by an actuator and further controlled by the control system. In other aspects, the distributor height may be passively controlled through an actuator system based on incoming mass flow and other process parameters.

In aspects according to the present disclosure, the continuous rotary plate filter apparatus comprises a filter plate retaining ring (1103) that secures the filter plate (1101) to the inner plate. In aspects according to the present disclosure, the filter plate retaining ring (1103) comprises an overflow lip that limits the thickness of the filter cake on the filter plate (1101). In aspects according to the present disclosure, the overflow lip extends 5 mm to 50 mm from the porous surface of the filter plate (1101). In aspects according to the present disclosure, the overflow lip extends 5 mm to 10 mm from the porous surface of the filter plate (1101). In aspects according to the present disclosure, the overflow lip extends 5 mm to 15 mm from the porous surface of the filter plate (1101). In aspects according to the present disclosure, the overflow lip extends 5 mm to 20 mm from the porous surface of the filter plate (1101). In aspects according to the present disclosure, the overflow lip extends 20 mm to 50 mm from the porous surface of the filter plate (1101).

Different detectors are provided to determine filter cake dimensions (e.g., height and width). In aspects according to the present disclosure, the continuous rotary plate filter apparatus further comprises a feedback loop that controls the stream of slurry to maintain a constant thickness of the filter cake on the filter plate (1101). In aspects according to the present disclosure, the feedback loop comprises a sensor to measure thickness of the filter cake on the filter plate (1101). In aspects according to the present disclosure, the sensor is not in direct physical contact with the filter cake. In aspects according to the present disclosure, the sensor is selected from the group consisting of a laser sensor (1702), an ultrasonic sensor, and a UV-Vis reflective optical sensor. In aspects according to the present disclosure, the sensor measures the thickness of the filter cake at any radial position on the filter plate (1101). In aspects according to the present disclosure, the sensor measures the thickness of the filter cake at multiple radial positions on the filter plate (1101) simultaneously. In aspects according to the present disclosure, the sensor measures the thickness of the filter cake at multiple radial positions on the filter plate (1101) simultaneously providing cake contour for improved accuracy. In aspects according to the present disclosure, the continuous rotary plate filter apparatus further comprises a vision system camera, Keyence 65001V (1701) for measuring the width of the filter cake on the filter plate (1101). In aspects according to the present disclosure, the continuous rotary plate filter apparatus further comprises an ultrasonic system for measuring the width of the filter cake on the filter plate (1101). In aspects according to the present disclosure, the continuous rotary plate filter apparatus further comprises a UV-Vis reflective optical sensor system for measuring the width of the filter cake on the filter plate (1101).

In aspects according to the present disclosure, the continuous rotary plate filter apparatus comprises a rotatable inner plate supporting the filter plate (1101).

In aspects according to the present disclosure, the continuous rotary plate filter apparatus further comprises a bearing that supports the inner plate. The bearing enables the internal plate to freely rotate about its axis. The bearing may be located within the housing.

Figure 5:
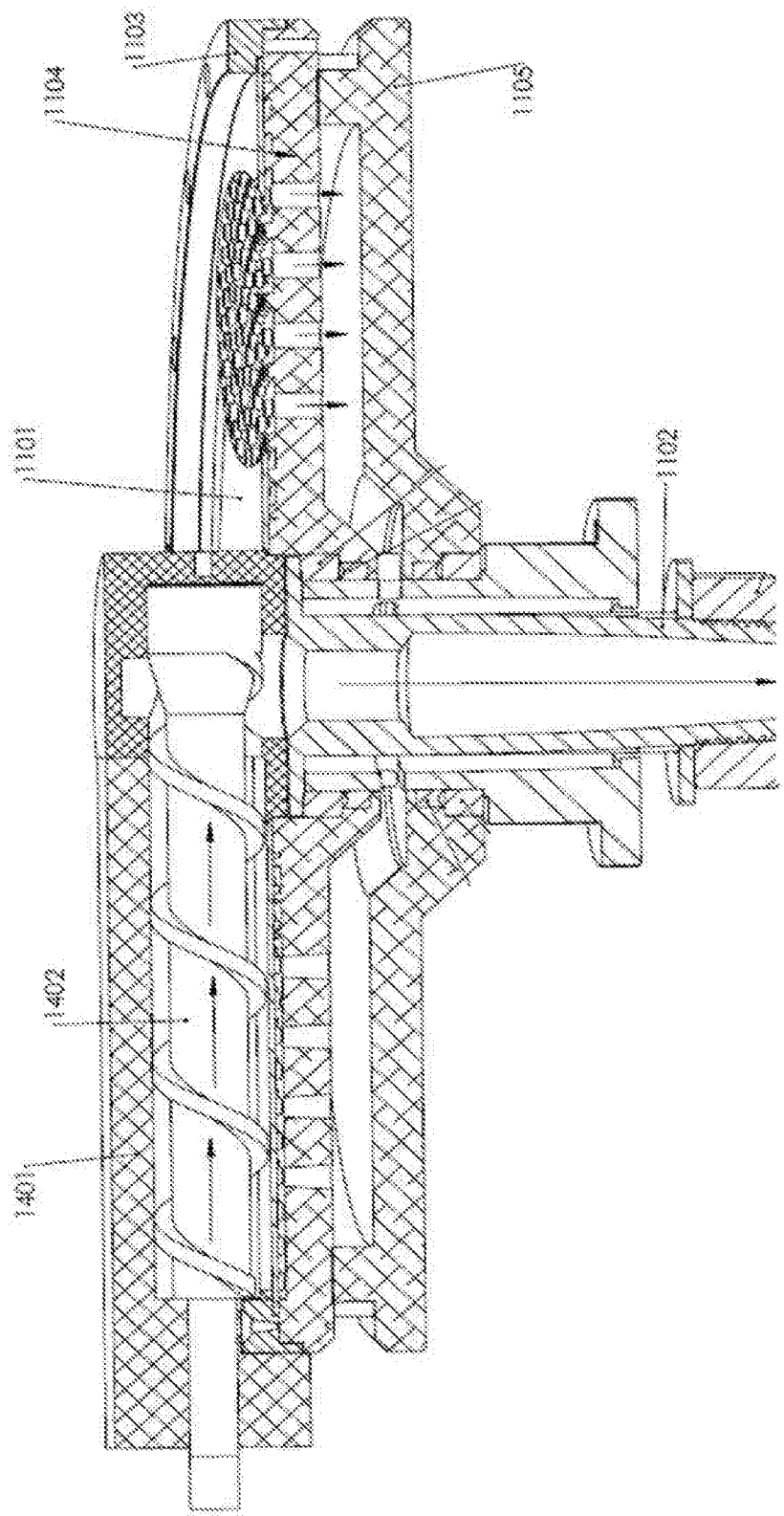
FIG. 5 depicts an expanded and cut-away front view of an exemplary continuous rotary plate filter apparatus, showing the path of material flow. An auger (1402), located within an auger housing (1401), propagates a filter cake centripetally to the direction of rotation of a filter plate (1101) and into a filter cake outlet (1102), which is held in place by a filter cake outlet nut (1109). A filtrate can flow through a porous filter plate (1101), which is secured by a filter plate retaining ring (1103), through holes in a filter support plate (1104) and onto a bottom vacuum plate (1105), wherein it flows along a center shaft (1106) and out a filtrate outlet (1107, shown in FIG. 1 and FIG. 6).
Figure 6:
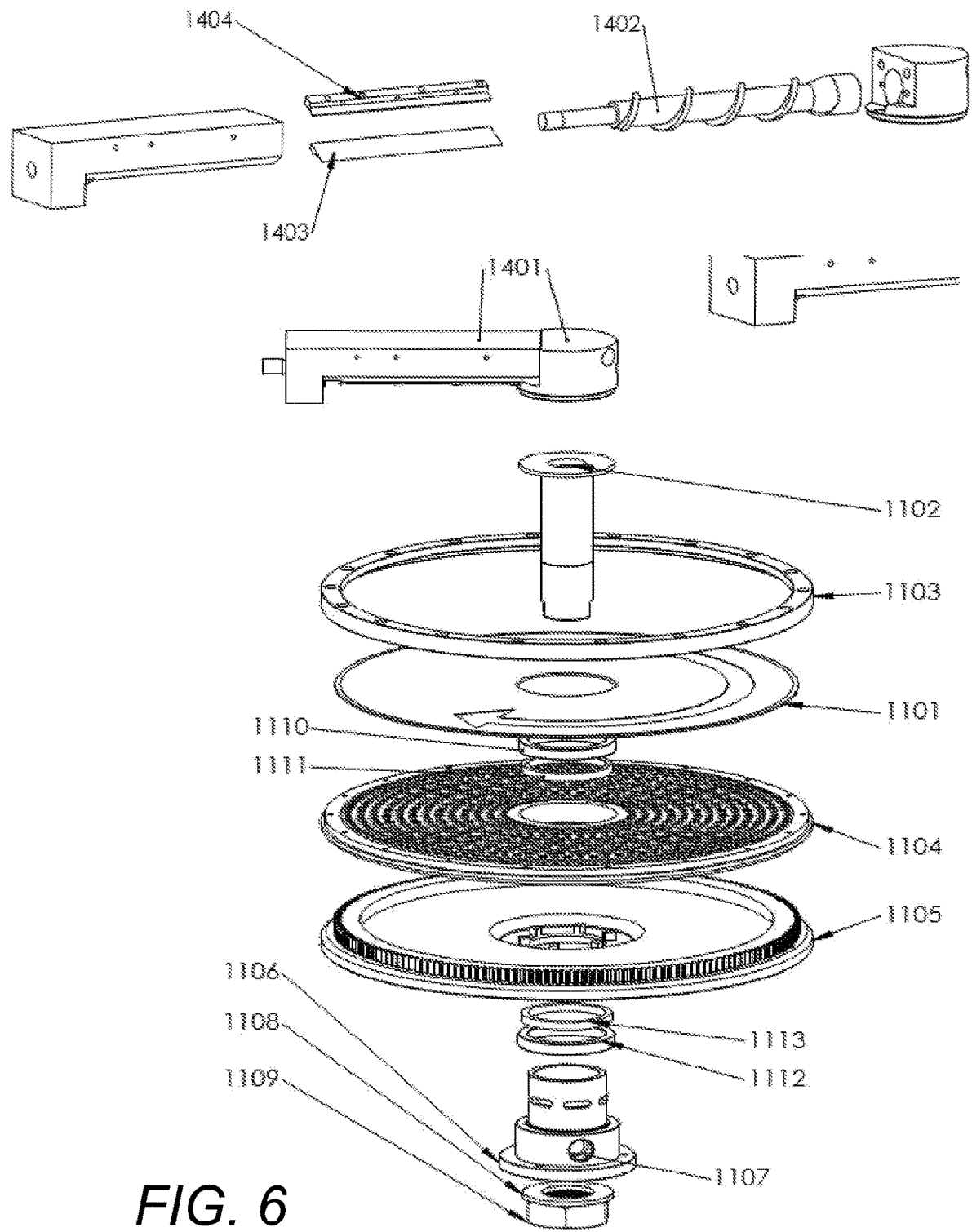
FIG. 6 depicts an exploded front view of an exemplary continuous rotary plate filter apparatus, showing a filter sub-assembly comprising a filter plate (1101), a filter cake outlet (1102), a filter plate retaining ring (1103), a filter support plate (1104), a bottom vacuum plate (1105), a center shaft (1106), a filtrate outlet (1107), a filter cake outlet washer (1108) and a filter cake outlet nut (1109); and an auger sub-assembly comprising an auger housing (1401), an auger (1402), a scraper (1403), and a scraper holder (1404).
Figure 7A:
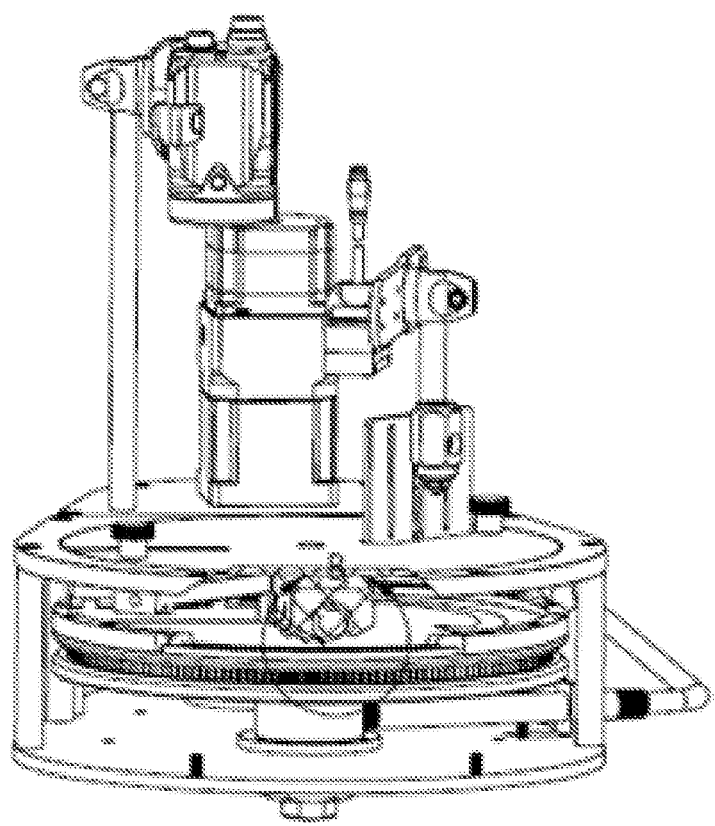
FIG. 7 depicts an expanded and cut-away side view of an exemplary continuous rotary plate filter apparatus, showing how a filter cake is removed from the surface of a porous filter plate (1101), which is supported by a filter support plate (1104) resting upon a bottom vacuum plate (1105), through the combined action of a scraper (1403), which is secured by a scraper blade holder (1404), and an auger (1402).
Figure 7B:
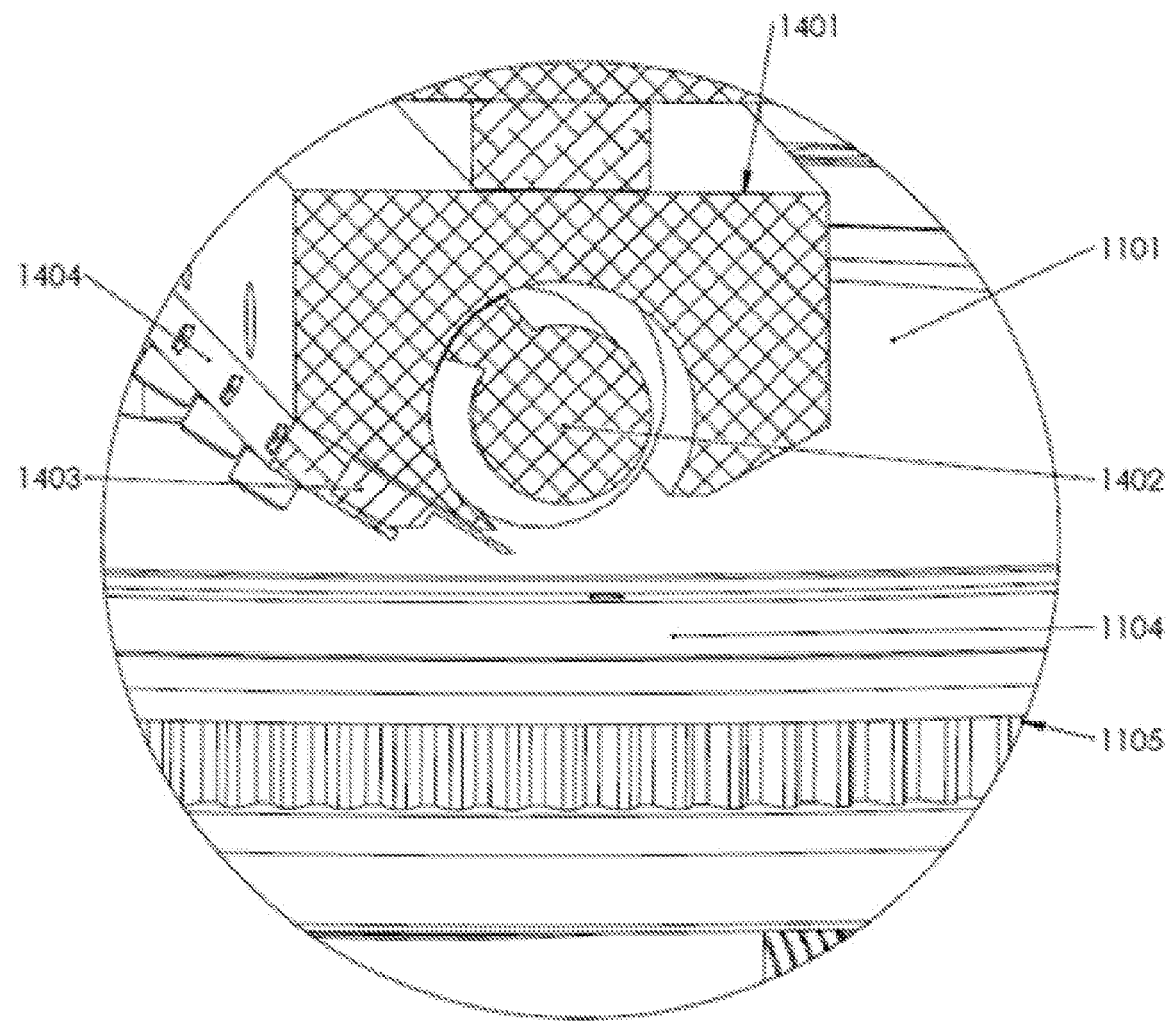
Figure 8:
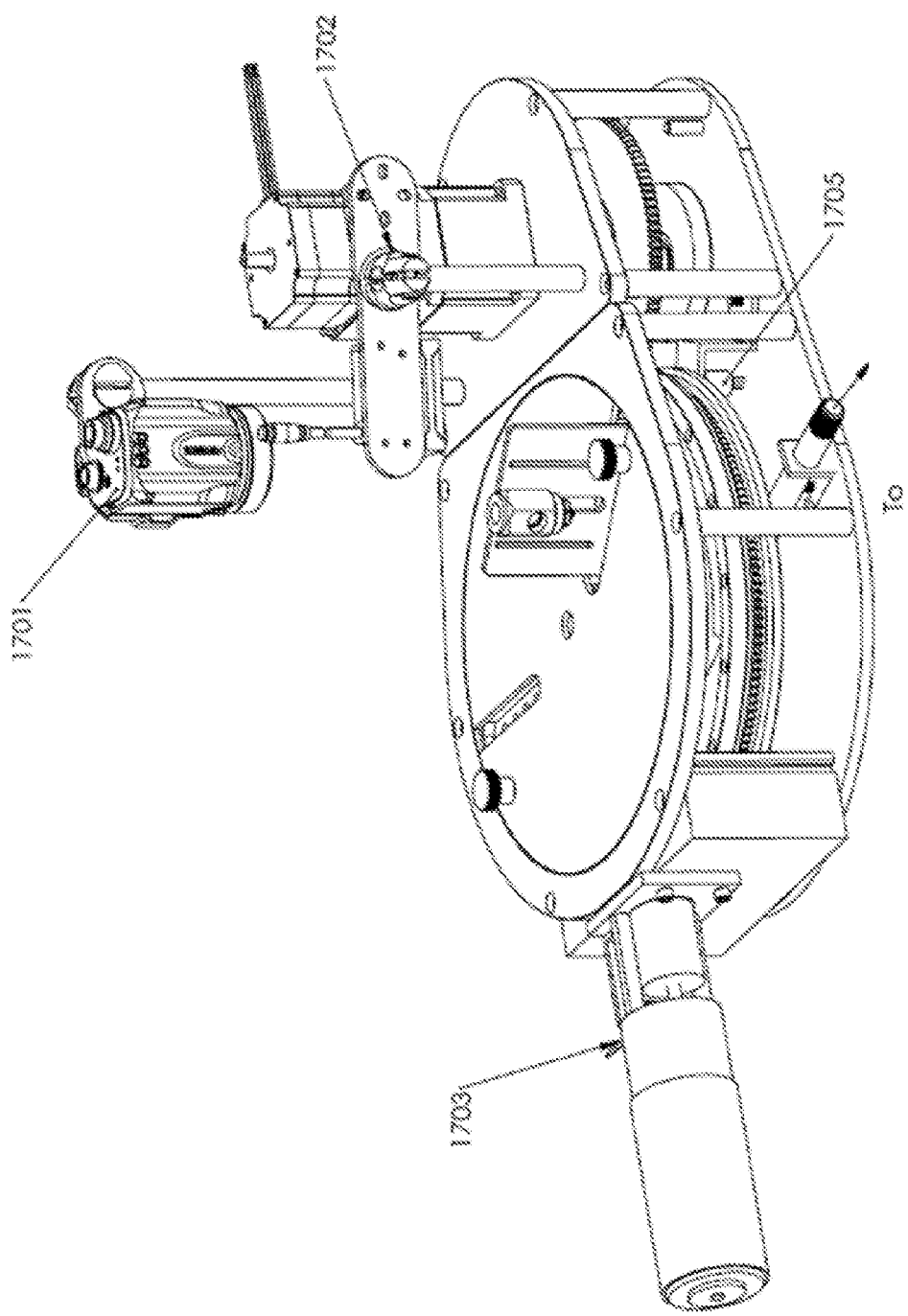
FIG. 8 depicts a front view of sensor and camera systems of an exemplary continuous rotary plate filter apparatus. These include a port for the vision system camera (1701), a cake-thickness measuring laser sensor (1702), an auger speed sensor (1703), and a filter plate speed sensor (1705).

In aspects according to the present disclosure, the continuous rotary plate filter apparatus further comprises a screw cap that applies a biasing force on the inner plate to position the inner plate at a desired location along its axis, within the housing. This screw cap may be located between the auger housing and the base secured by the locking nut (1109 in FIG. 5), all of which are contained within the housing.

In aspects according to the present disclosure, the inner plate is magnetically coupled to a driving member. In aspects according to the present disclosure, the continuous rotary plate filter apparatus further comprises a magnet that applies a biasing force on the inner plate to position the inner plate at a desired location along its axis, within the housing. Magnetically coupling the inner plate to a driving member thus eliminates the need for a spring.

In aspects according to the present disclosure, the continuous rotary plate filter apparatus comprises an inner plate rotator for rotating the inner plate. The inner plate rotates, propagating slurry through a cake wash as well as the plate itself through a plate wash. In aspects according to the present disclosure, the inner plate rotator comprises an external drive unit for rotating the inner plate. The inner plate may be coupled through a gear to an external drive unit, eliminating the seals which would be necessary for a drive shaft to pass through the center of the plate. In aspects according to the present disclosure, the continuous rotary plate filter apparatus does not use internal prime movers to rotate the inner plate and instead uses an external prime mover that is not part of the inner plate. In aspects according to the present disclosure, the continuous rotary plate filter apparatus does not use traditional seals or other isolation mechanisms. In aspects according to the present disclosure, the inner plate is coupled to the external drive unit through a gear (1202).

In addition, seals associated with a drive shaft that penetrates the filter's outer housing may be eliminated by magnetic coupling of the external prime mover to an internal drive shaft. Prior art rotary filter units generally cannot employ a magnetic coupled drive, because the size of such units it too great and the magnetic coupling is incapable of providing the required torque. In contrast, a small, rotary plate filter can make use of a magnetic drive because of the relatively low torque required to rotate the smaller sized device.

In aspects according to the present disclosure, the continuous rotary plate filter apparatus further comprises a motor (1201) for rotating the inner plate. In aspects according to the present disclosure, the inner plate is driven by a gear (1202), which is directly coupled to an external motor (1201). In aspects according to the present disclosure, the inner plate is coupled to the external drive unit through a drive shaft. In aspects according to the present disclosure, the inner plate rotator comprises a magnetic coupling for rotating the inner plate. The plate could also be coupled to the external drive through means of a belt, toothed belt, or chain. In aspects according to the present disclosure, the inner plate rotator further comprises a rotation controller for controlling a rotational speed of the inner plate. In aspects according to the present disclosure, the inner plate rotator further comprises a speed sensor (1705) for measuring a rotational speed of the inner plate.

In aspects according to the present disclosure, the inner plate comprises a filter support plate (1104) and a bottom vacuum plate (1105). In aspects according to the present disclosure, the filter support plate (1104) comprises a plurality of holes adapted to convey the filtrate through the filter support plate (1104) onto the bottom vacuum plate (1105). In aspects according to the present disclosure, the continuous rotary plate filter apparatus further comprises a center shaft (1106) in fluid communication with the bottom vacuum plate and the filtrate outlet (1107), wherein the continuous rotary plate filter apparatus is adapted to convey the filtrate from the bottom vacuum plate (1105) through the center shaft (1106) to the filtrate outlet. In aspects according to the present disclosure, the continuous rotary plate filter apparatus further comprises a filtrate flow meter. In aspects according to the present disclosure, the filtrate outlet (1107) is preferably adapted to couple to a fluid line connected with a vacuum source (e.g., a vacuum pump). In aspects according to the present disclosure, the continuous rotary plate filter apparatus further comprises a vacuum pump connected to the filtrate outlet (1107).

In aspects according to the present disclosure, the continuous rotary plate filter apparatus further comprises a pressure equalizer for equalizing a pressure drop within the housing as gas within the housing is drawn into the inner plate through the filter plate (1101). In aspects according to the present disclosure, the pressure equalizer comprises an orifice through which gas flowing through the filtrate outlet (1107) is drawn. In aspects according to the present disclosure, the orifice is located in proximity to the porous surface of the filter plate (1101). A fluid flow through the filter plate may be optimized by selecting an appropriate size of the orifice in the plate. In aspects according to the present disclosure, a plurality of fluid channels in fluid communication with the filtrate outlet (1107) are provided on the inner plate. In aspects according to the present disclosure, the continuous rotary plate filter apparatus further comprises a plurality of filtrate tubes in fluid communication with the filtrate outlet (1107). The plurality of filtrate tubes connect the fluid channels in fluid communication with a cavity, thereby establishing a fluid path between the channels and the filtrate outlet. In aspects according to the present disclosure, a plate separates the cavity into an upper portion and a lower portion. The plate is fixedly attached to the housing, with the inner plate being free to rotate. An orifice controls a gas flow between the upper portion and the lower portion of the cavity and thereby controls gas flow through the filter from inside the housing. In aspects according to the present disclosure, the continuous rotary plate filter apparatus further comprises a plurality of fluid channels on the inner plate in fluid communication with a cavity, and a plurality of filtrate tubes in fluid communication with the cavity and the filtrate outlet (1107), wherein a plate fixedly attached to the housing separates the cavity into an upper portion and a lower portion wherein the upper and lower portions are connected by the orifice. In aspects according to the present disclosure, a cavity is machined out during inner-plate fabrication (see, e.g., FIG. 5, 1104). In aspects according to the present disclosure, the pressure equalizer further comprises a pressure controller and a pressure sensor.

Different mechanisms are provided to evenly and accurately distribute a wash solvent across the filter cake. In aspects according to the present disclosure, the continuous rotary plate filter apparatus comprises a filter cake washer (1305 shows this as a wash block). In aspects according to the present disclosure, the wash solvent block (1305) comprises one or more nozzles for applying a washing solvent to the filter cake. In aspects according to the present disclosure, the one or more nozzles for applying a washing solvent to the filter cake are selected from the group consisting of drip nozzles, pneumatic spray nozzles, non-pneumatic misting nozzles, electrospray nozzles, ultrasonic spray nozzles, and ultrasonic nebulizers (1303 in FIG. 1 illustrates a filter cake spray nozzle washer). In aspects according to the present disclosure, the one or more nozzles are configured to provide a homogeneous distribution of the washing solvent.

In aspects according to the present disclosure, the continuous rotary plate filter apparatus further comprises a feed-forward loop that controls the wash solvent block (1305). In aspects according to the present disclosure, the feed-forward loop comprises a sampling port for removing a sample of the filter cake. In aspects according to the present disclosure, the feed-forward loop comprises a detector for detecting impurities in the filter cake. In aspects according to the present disclosure, the detector comprises an optical sensor. In aspects according to the present disclosure, the detector comprises a colorimeter, a near-infrared (NIR) sensor, or a Fourier Transform Infrared (FTIR) sensor. In aspects according to the present disclosure the continuous rotary plate filter apparatus further comprises a feed-backward loop that controls inlet volumetric feed rate. In aspects according to the present disclosure, the feed-backward loop comprises a cake height sensor (1702) for detecting the height of the cake.

In aspects according to the present disclosure, the continuous rotary plate filter apparatus comprises a gas inlet, whereby a gas is drawn into the housing to dry the filter cake. In aspects according to the present disclosure, the gas inlet is located on a side of the housing. In aspects according to the present disclosure, the gas is air. In aspects according to the present disclosure, the air is dry. In aspects according to the present disclosure, the gas is inert. In aspects according to the present disclosure, the inert gas is nitrogen or argon.

In aspects according to the present disclosure, the continuous rotary plate filter apparatus comprises a scraper (1403) for removing a solid filter cake from the filter plate (1101). In aspects according to the present disclosure, the scraper (1403) comprises a material selected from the group consisting of polymers, metal, ceramic, and wood. In aspects according to the present disclosure, the scraper (1403) comprises a material selected from the group consisting of polyoxymethylene, polymethylpentene, perfluoroalkoxy, polytetrafluoroethylene, high-density polyethylene, high molecular weight polyethylene, ultra-high molecular weight polyethylene, polypropylene, high molecular weight polypropylene, ultra-high molecular weight polypropylene, stainless steel, and combinations thereof.

In aspects according to the present disclosure, the scraper (1403) comprises a blade or a brush. In aspects according to the present disclosure, the distance between the scraper (1403) and the filter plate (1101) is adjustable. In aspects according to the present disclosure, the distance between the scraper (1403) and the filter plate (1101) is adjustable automatically. In aspects according to the present disclosure, the distance between the scraper (1403) and the filter plate (1101) is fixed.

In aspects according to the present disclosure, the continuous rotary plate filter apparatus further comprises a compressed gas source and a compressed gas inlet for removing the filter cake from the filter plate (1101). In aspects according to the present disclosure, the compressed gas inlet is located in proximity to the porous surface of the filter plate (1101). In aspects according to the present disclosure, the compressed gas is air. In aspects according to the present disclosure, the compressed air is dry. In aspects according to the present disclosure, the compressed gas is inert. In aspects according to the present disclosure, the compressed inert gas is nitrogen or argon.

In aspects according to the present disclosure, the scraper blade alone is used to collect the filter cake from the filter plate (1101). In aspects according to the present disclosure, the continuous rotary plate filter apparatus further comprises a gas inlet to provide a counter-flow of gas (e.g., compressed air) for removing the filter cake from the filter plate (1101). In aspects according to the present disclosure, the continuous rotary plate filter apparatus further comprises a plunger for removing the filter cake from the filter plate (1101). In aspects according to the present disclosure, the filter cake is collected using gravity.

In aspects according to the present disclosure, the continuous rotary plate filter apparatus comprises an auger (1402) for conveying the removed filter cake. In aspects according to the present disclosure, the filter cake is removed from the filter plate (1101) by the combined action of an auger and an adjustable elongated edge (e.g., a scraper) attached to, or being formed as an adjustable part of, the auger housing (1401). This edge is generally sharp, has a length that is substantially equal to that of said inner plate, and extends adjacent to the outer surface of the filter plate (1101). Other means to remove the filter cake from the rotating plate include bursts of compressed gas or air, or a plunger via piston-like action. The auger may be driven by direct coupling to an external motor. The auger may also be driven by mechanically connecting to the driven gear on the filter support plate, linking the respective speeds to one another.

In aspects according to the present disclosure, the auger (1402) conveys the removed filter cake towards the filter cake outlet (1102). In aspects according to the present disclosure, the auger (1402) conveys the removed filter cake in a direction centripetal to the rotation of the inner plate. In aspects according to the present disclosure, the auger (1402) conveys the removed filter cake in a direction centrifugal to the rotation of the inner plate. In aspects according to the present disclosure, the auger (1402) is driven by direct coupling to an external auger motor (1501). In aspects according to the present disclosure, the continuous rotary plate filter apparatus further comprises an auger speed sensor (1703) for measuring a rotational speed of the auger (1402). In aspects according to the present disclosure, the filter cake outlet (1102) is oriented vertically. In aspects according to the present disclosure, the filter cake outlet (1102) is oriented horizontally. When the filter cake outlet (1102) is oriented vertically, a gravitational force facilitates the removal of the filter cake from the housing. In aspects according to the present disclosure, the filter cake outlet (1102) widens as it lengthens; however, the exit port (1102) is not dependent on this expansion design, and can function with a constant diameter outlet as well. In aspects according to the present disclosure, the filter cake outlet (1102) is located at the center of the filter plate (1101). In aspects according to the present disclosure, the filter cake outlet (1102) is elongated and is located along one side of the housing, extending generally in alignment with the outer surface of the filter.

Figure 2:
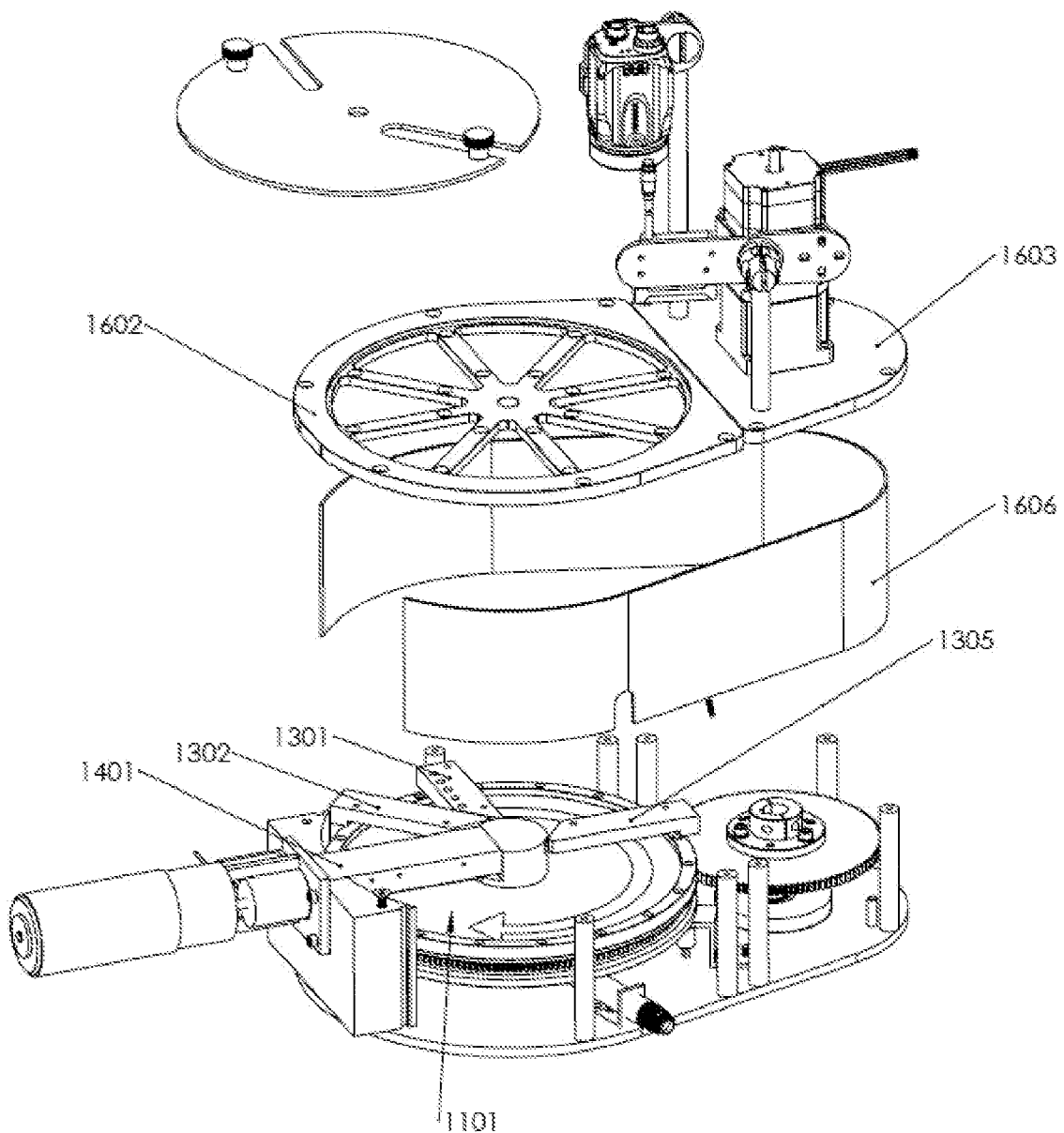
FIG. 2 depicts an exploded front view of an exemplary continuous rotary plate filter apparatus, showing a slurry feed block (1301), a wash solvent block (1302), a slurry wash block (1305), a filter plate (1101), an inner plate rotator motor top plate (1603), a side panel (1606), and an auger housing (1401), which is secured by a filter top plate (1602).

In aspects according to the present disclosure, the continuous rotary plate filter apparatus comprises an in-line cleaner for cleaning one or more components of the apparatus. In aspects according to the present disclosure, the in-line cleaner comprises one or more nozzles (example is depicted in FIG. 2 with 1302) for applying a cleaning solvent to the filter plate (1101). In aspects according to the present disclosure, the one or more nozzles for applying a cleaning solvent to the filter plate (1101) are selected from the group consisting of drip nozzles, pneumatic spray nozzles, non-pneumatic misting nozzles, electrospray nozzles, ultrasonic spray nozzles, and ultrasonic nebulizers. In aspects according to the present disclosure, the one or more nozzles are configured to provide a homogeneous distribution of the cleaning solvent.

In aspects according to the present disclosure, the continuous rotary plate filter apparatus comprises an in-line sterilizer for the sterilization of one or more components of the apparatus. In aspects according to the present disclosure, one or more components of the apparatus are sterile.

Equipment surfaces that are in contact with components, in-process materials, or drug products must not be reactive, additive, or absorptive so as to alter the drug product's safety, identity, strength, quality, or purity beyond its official or established requirements. See, e.g., 21 C.F.R. § 211.65: Equipment construction; and 21 C.F.R. § 211.67: Equipment cleaning and maintenance.

In aspects according to the present disclosure, the continuous rotary plate filter apparatus comprises one or more components that are compatible with a solvent selected from the group consisting of acetone, benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, dimethyl sulfoxide, ethyl acetate, heptane, hexane, methyl t-butyl ether, methyl isobutyl ketone, methylene chloride, N-methyl-2-pyrrolidinone, nitromethane, pentane, ligroine, tetrahydrofuran, toluene, triethylamine, o-xylene, m-xylene, p-xylene, and combinations thereof.

In some applications, the continuous rotary plate apparatus must be sterile. For such applications, the housing is fabricated from a material that can be readily sterilized, e.g., using ethylene oxide, hydrogen peroxide, alcohol, soap, acetone, steam, gamma radiation, electron beam radiation, or light. In aspects according to the present disclosure, the continuous rotary plate filter apparatus comprises one or more components that are fabricated from one or more sterilizable materials. In aspects according to the present disclosure, the sterilizable materials are sterilizable using ethylene oxide, hydrogen peroxide, alcohol, soap, acetone, steam, gamma radiation, electron beam radiation, or light.

In aspects according to the present disclosure, the continuous rotary plate filter apparatus comprises one or more components that are fabricated from one or more regulatory-compliant materials. United States Food and Drug Administration (FDA) has provided guidance on materials for the construction of pharmaceutical equipment. (available on the internet at: www.fda.gov/drugs/guidancecomplianceregulatoryinformation/guidances/ucm124777.htm#list; and www.fda.gov/drugs/guidancecomplianceregulatoryinformation/guidances/ucm124777.htm#13).

In aspects according to the present disclosure, the continuous rotary plate filter apparatus comprises one or more components that are fabricated from one or more chemically-inert materials.

In aspects according to the present disclosure, the continuous rotary plate filter apparatus comprises one or more components that are fabricated from a material selected from the group consisting of stainless steel, nickel-based alloys, borosilicate glass, ceramics, and combinations thereof. In aspects according to the present disclosure, the continuous rotary plate filter apparatus comprises one or more components that are fabricated from a material comprising stainless steel. In aspects according to the present disclosure, the continuous rotary plate filter apparatus comprises one or more components that are fabricated from a material comprising a nickel-based alloy. In aspects according to the present disclosure, the continuous rotary plate filter apparatus comprises one or more components that are fabricated from a material comprising borosilicate glass. In aspects according to the present disclosure, the continuous rotary plate filter apparatus comprises one or more components that are fabricated from a material comprising ceramics. In aspects according to the present disclosure, the continuous rotary plate filter apparatus comprises one or more components that are fabricated from a polymeric material that is stable to organic solvents, caustic and corrosive aqueous solutions, while maintaining its requisite mechanical and physical properties. In other aspects, one or more components may be fabricated from anodized aluminum or other suitable corrosion resistant metal as described above.

Another aspect of the present disclosure is directed to a method for using a rotary plate filter to continuously process a slurry. The method includes steps generally consistent with the functions of the elements included in the continuous rotary plate filter apparatus described above. The continuous rotary plate filter apparatus is a self-contained technology that solves the aforementioned problems by performing the following functions in an automated fashion: 1) providing a slurry to a slurry inlet within the apparatus; 2) rotating a filter plate; 3) filtering the slurry through the filter plate to form a filtrate and a solid filter cake; 4) washing the solid filter cake with an appropriate wash solvent to remove unwanted impurities; 5) passing the filtrate through a filtrate outlet; 6) removing the filter cake from the filter plate; and 7) passing the filter cake through a filter cake outlet.

The filtrate outlet may be connected to a vacuum source that draws the filtrate through the filter plate (1101). Solids in the slurry are thus deposited as a filter cake on the outer surface of the filter plate while liquid from the slurry is drawn through the filter cake and the filter plate to be collected as a filtrate. Air drawn into the housing through an inlet passes through the filter plate and partially dries the filter cake that has been rotated out of the slurry. As the inner plate rotates, a scraper (1403), which may be attached to the auger housing (1401) scrapes away the filter cake. The filter cake may be removed from the plate by an auger (1402), which propagates the cake material to the center of the filter plate (1101) where a filter cake outlet (1102) is located. A simple overflow lip level may be included to limit the slurry level to a defined maximum. The device is thus useful for solid-liquid separations in both the continuous and batch processing of many types of slurries, and can be cleaned-in-place as necessary.

In aspects according to the present disclosure, slurries comprising a chemical product (e.g., intermediate or API) in solid (e.g., crystalline, or amorphous) form and certain impurities are pumped into the continuous filter where the solids are filtered and washed with different solvents. The flow rate of the slurry is controlled by a feedback control loop to maintain a constant level corresponding to a given residence time for the filtration process. The filter works by applying a thin layer of slurry on top of a rotating, porous plate. Wash solvent is applied to the slurry and pulled through the plate by a vacuum. The washed slurry is then scraped from the surface and conveyed by an auger into the filter cake outlet.

In aspects according to the present disclosure, a method is provided for continuously filtering a stream of slurry using an apparatus comprising: a housing; a slurry feed block (1301); a removable, rotatable filter plate (1101) having a porous surface for receiving the slurry from the slurry feed block (1301); a rotatable inner plate supporting the filter plate (1101); an inner plate rotator for rotating the inner plate; a wash solvent block (1305); a filtrate outlet (1107) in fluid communication with the filter plate (1101) adapted to convey the filtrate from the housing; a scraper (1403) for removing a solid filter cake from the filter plate (1101); and a filter cake outlet (1102) adapted to convey the filter cake from the housing; wherein the method comprises: a) providing a slurry to the slurry feed block (1301); b) rotating the filter plate (1101); c) filtering the slurry through the filter plate (1101) to form a filtrate and a solid filter cake; d) passing the filtrate through the filtrate outlet (1107); e) removing the filter cake from the filter plate (1101); and f) passing the filter cake through the filter cake outlet (1102). In aspects according to the present disclosure, continuous filtering is under a state of control with respect to the incoming flow rate of the slurry. In aspects according to the present disclosure, continuous filtering is at steady state with respect to the concentration of the slurry. In aspects according to the present disclosure, continuous filtering is at steady state with respect to the composition of the slurry. In aspects according to the present disclosure, continuous filtering is at steady state with respect to the incoming flow rate of the slurry, the concentration of the slurry, the composition of the slurry, and combinations thereof.

In aspects according to the present disclosure, the continuous rotary plate filter apparatus is capable of being run continuously for 1 day to 1 year or more without requiring a shut down or replacement of the membranes. In aspects according to the present disclosure, the slurry is processed continuously for 1 hour to 1 day. In aspects according to the present disclosure, the slurry is processed continuously for 1 hour to 1 week. In aspects according to the present disclosure, the slurry is processed continuously for 1 hour to 1 month. In aspects according to the present disclosure, the slurry is processed continuously for 1 hour to 1 year. In aspects according to the present disclosure, the slurry is processed continuously for 1 day to 1 week. In aspects according to the present disclosure, the slurry is processed continuously for 1 day to 1 month. In aspects according to the present disclosure, the slurry is processed continuously for 1 day to 1 year. In aspects according to the present disclosure, the slurry is processed continuously for 1 week to 1 month. In aspects according to the present disclosure, the slurry is processed continuously for 1 week to 1 year. In aspects according to the present disclosure, the slurry is processed continuously for 1 month to 1 year. In aspects according to the present disclosure, the slurry is processed continuously for at least 1 hour. In aspects according to the present disclosure, the slurry is processed continuously for at least 1 day. In aspects according to the present disclosure, the slurry is processed continuously for at least 1 week. In aspects according to the present disclosure, the slurry is processed continuously for at least 1 month. In aspects according to the present disclosure, the slurry is processed continuously for at least 1 year.

Assuming the slurry is in contact with the filter plate (1101) for 270° of rotation between the slurry inlet and the auger, a filter plate rotation speed of 15 rpm gives a 3-second residence time. In aspects according to the present disclosure, the inner plate rotates at between 15 rpm and 0.075 rpm. In aspects according to the present disclosure, the inner plate rotates at between 15 rpm and 0.1 rpm. In aspects according to the present disclosure, the inner plate rotates at between 15 rpm and 0.5 rpm. In aspects according to the present disclosure, the inner plate rotates at between 15 rpm and 1 rpm. In aspects according to the present disclosure, the inner plate rotates at between 15 rpm and 5 rpm. In aspects according to the present disclosure, the inner plate rotates at between 15 rpm and 10 rpm. In aspects according to the present disclosure, the inner plate rotates at 15 rpm or less. In aspects according to the present disclosure, the inner plate rotates at 10 rpm or less. In aspects according to the present disclosure, the inner plate rotates at 5 rpm or less. In aspects according to the present disclosure, the inner plate rotates at 1 rpm or less. In aspects according to the present disclosure, the inner plate rotates at 0.5 rpm or less. In aspects according to the present disclosure, the inner plate rotates at 0.1 rpm or less. In aspects according to the present disclosure, the inner plate rotates at 0.075 rpm. In aspects according to the present disclosure, the inner plate rotates at between 15 rpm and 0.075 rpm.

In aspects according to the present disclosure, the method further comprises washing the filter cake with a washing solvent. In aspects according to the present disclosure, the method further comprises passing the washing solvent through the filtrate outlet (1107). In aspects according to the present disclosure, the ratio of the mass flow rate of the slurry to the mass flow rate of the washing solvent is about 10:1 to about 1:10. In aspects according to the present disclosure, the ratio of the mass flow rate of the slurry to the mass flow rate of the washing solvent is about 5:1 to about 1:5. In aspects according to the present disclosure, the ratio of the mass flow rate of the slurry to the mass flow rate of the washing solvent is about 2:1 to about 1:2. In aspects according to the present disclosure, the washing solvent selected from the group consisting of acetonitrile, acetone, benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, dimethyl sulfoxide, ethanol, ethyl acetate, heptane, hexane, methyl t-butyl ether, methyl isobutyl ketone, methanol, methylene chloride, N-methyl-2-pyrrolidinone, nitromethane, pentane, ligroine, tetrahydrofuran, toluene, triethylamine, water, o-xylene, m-xylene, p-xylene, and combinations thereof.

In aspects according to the present disclosure, the continuous rotary plate filter apparatus outputs 1 g to 1500 kg of filter cake per hour (dry weight basis). In aspects according to the present disclosure, the continuous rotary plate filter apparatus outputs 1 g to 10 kg of filter cake per hour. In aspects according to the present disclosure, the continuous rotary plate filter apparatus outputs 1 g to 1 kg of filter cake per hour. In aspects according to the present disclosure, the continuous rotary plate filter apparatus outputs 1 g to 100 g of filter cake per hour. In aspects according to the present disclosure, the continuous rotary plate filter apparatus outputs 1 g to 10 g of filter cake per hour. In aspects according to the present disclosure, the continuous rotary plate filter apparatus outputs 10 g to 20 kg of filter cake per hour. In aspects according to the present disclosure, the continuous rotary plate filter apparatus outputs 10 g to 10 kg of filter cake per hour. In aspects according to the present disclosure, the continuous rotary plate filter apparatus outputs 10 g to 1 kg of filter cake per hour. In aspects according to the present disclosure, the continuous rotary plate filter apparatus outputs 10 g to 100 g of filter cake per hour. In aspects according to the present disclosure, the continuous rotary plate filter apparatus outputs 100 g to 20 kg of filter cake per hour. In aspects according to the present disclosure, the continuous rotary plate filter apparatus outputs 100 g to 10 kg of filter cake per hour. In aspects according to the present disclosure, the continuous rotary plate filter apparatus outputs 100 g to 1 kg of filter cake per hour. In aspects according to the present disclosure, the continuous rotary plate filter apparatus outputs 1 kg to 20 kg of filter cake per hour. In aspects according to the present disclosure, the continuous rotary plate filter apparatus outputs 1 kg to 10 kg of filter cake per hour. In aspects according to the present disclosure, the continuous rotary plate filter apparatus outputs 10 kg to 20 kg of filter cake per hour. In aspects according to the present disclosure, the continuous rotary plate filter apparatus outputs 10 kg to 100 kg of filter cake per hour. In aspects according to the present disclosure, the continuous rotary plate filter apparatus outputs 100 kg to 200 kg of filter cake per hour. In aspects according to the present disclosure, the continuous rotary plate filter apparatus outputs 100 kg to 1000 kg of filter cake per hour. In aspects according to the present disclosure, the continuous rotary plate filter apparatus outputs 100 kg to 1500 kg of filter cake per hour. In aspects according to the present disclosure, the continuous rotary plate filter apparatus outputs 1 kg to 200 kg of filter cake per hour. In aspects according to the present disclosure, the continuous rotary plate filter apparatus outputs 1 kg to 500 kg of filter cake per hour. In aspects according to the present disclosure, the continuous rotary plate filter apparatus outputs 500 kg to 1000 kg of filter cake per hour.

In aspects according to the present disclosure, the slurry and the washing solvent are at a temperature of −10° C. to 100° C. In aspects according to the present disclosure, the processing is carried out at an elevated temperature. In aspects according to the present disclosure, the slurry and the washing solvent are at a temperature of 25° C. to 100° C. In aspects according to the present disclosure, the slurry and the washing solvent are at a temperature of 50° C. to 100° C. In aspects according to the present disclosure, the slurry and the washing solvent are at a temperature of 75° C. to 100° C.

In aspects according to the present disclosure, the slurry and the washing solvent are at a temperature of −10° C. to 25° C. In aspects according to the present disclosure, the processing is carried out at an lowered temperature. In aspects according to the present disclosure, the slurry and the washing solvent are at a temperature of −10° C. to 25° C. In aspects according to the present disclosure, the slurry and the washing solvent are at a temperature of 0° C. to 25° C. In aspects according to the present disclosure, the slurry and the washing solvent are at a temperature of 0° C. to 10° C.

In other aspects, the slurry can be at a higher temperature than the washing solvent. In an aspect the washing solvent may be a cold washing solvent of between. A cold washing solvent is a solvent between −10° C. to 25° C. In aspects according to the present disclosure, the cold washing solvent is at a temperature of −5° C. to 25° C. In aspects according to the present disclosure, the cold washing solvent is at a temperature of 0° C. to 25° C. In aspects according to the present disclosure, the cold washing solvent is at a temperature of 0° C. to 10° C.

In aspects according to the present disclosure, the method further comprises cleaning the filter plate (1101) with a cleaning solvent. In aspects according to the present disclosure, the cleaning solvent selected from the group consisting of acetonitrile, acetone, benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, dimethyl sulfoxide, ethanol, ethyl acetate, heptane, hexane, methyl t-butyl ether, methyl isobutyl ketone, methanol, methylene chloride, N-methyl-2-pyrrolidinone, nitromethane, pentane, ligroine, tetrahydrofuran, toluene, triethylamine, water, o-xylene, m-xylene, p-xylene, and combinations thereof.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Exemplary Embodiments

Embodiment 1. An apparatus for continuously processing a slurry comprising: a housing; a slurry feed and solvent wash assembly (1300); a removable, rotatable filter plate (1101) having a porous surface for receiving said slurry from said slurry feed assembly (1300); a rotatable inner plate supporting said filter plate (1101); an inner plate rotator for rotating said inner plate; a filtrate outlet (1107) in fluid communication with said filter plate (1101) adapted to convey a filtrate from said housing; a scraper (1403) for removing a solid filter cake from said filter plate (1101); and a filter cake outlet (1102) adapted to convey said filter cake from said housing.

Embodiment 2. The apparatus of claim 1, wherein said housing is opaque, translucent, or transparent.

Embodiment 3. The apparatus of embodiments 1 or 2, wherein said housing comprises a bottom plate (1601), a filter top plate (1602), an inner plate rotator motor top plate (1603), a removable lid (1605), and a side panel (1606).

Embodiment 4. The apparatus of any one of embodiments 1 to 3, wherein said slurry feed and solvent wash assembly (1300) comprises a slurry feed block (1301) and a slurry distributor (1304).

Embodiment 5. The apparatus of any one of embodiments 1 to 4, wherein said slurry feed and solvent wash assembly (1300) further comprises a wash solvent block (1302).

Embodiment 6. The apparatus of any one of embodiments 1 to 5, wherein said slurry feed and solvent wash assembly (1300) further comprises a slurry wash block (1305).

Embodiment 7. The apparatus of any one of embodiments 1 to 6, wherein said slurry feed block (1301) is located at the top or on the side of said housing.

Embodiment 8. The apparatus of any one of embodiments 1 to 7, wherein said feed and solvent wash assembly (1300) comprises a slurry feed block (1301) that is adapted to couple to a slurry line (1306) that conveys said slurry from an outlet of a slurry pump.

Embodiment 9. The apparatus of any one of embodiments 1 to 8, wherein said slurry feed block (1301) and said slurry line (1306) further comprise a temperature controller.

Embodiment 10. The apparatus of any one of embodiments 1 to 9, wherein said wash solvent block (1302) further comprises a temperature controller.

Embodiment 11. The apparatus of any one of embodiments 1 to 10, wherein said slurry feed block (1301) and said wash solvent block (1305) further comprise a temperature controller.

Embodiment 12. The apparatus of any one of embodiments 1 to 11, wherein said feed and solvent wash assembly (1300) comprises an oscillating deposition tube (1310) coupled to a slurry line (1306) that conveys said slurry from an outlet of a slurry pump.

Embodiment 13. The apparatus of any one of embodiments 1 to 12, wherein said oscillating deposition tube (1310) is adapted to oscillate along the radius of said rotatable filter plate (1101).

Embodiment 14. The apparatus of any one of embodiments 1 to 13, wherein said feed and solvent wash assembly (1300) and said slurry line (1306) further comprise a temperature controller.

Embodiment 15. The apparatus of any one of embodiments 1 to 14, wherein said porous surface has a pore size D90 of 0.01 microns (μm) to 100 μm.

Embodiment 16. The apparatus of any one of embodiments 1 to 15, wherein said porous surface has a pore size D90 of 0.1 μm to 10 μm.

Embodiment 17. The apparatus of any one of embodiments 1 to 16, wherein said porous surface is uniformly porous.

Embodiment 18. The apparatus of any one of embodiments 1 to 17, wherein said filter plate (1101) further comprises a filtration aid.

Embodiment 19. The apparatus of any one of embodiments 1 to 18, wherein said filtration aid is selected from the group consisting of silica gel, functionalized silica gel, diatomaceous earth, alumina, aluminosilicates, and combinations thereof.

Embodiment 20. The apparatus of any one of embodiments 1 to 19, wherein said filter plate (1101) further comprises a coating.

Embodiment 21. The apparatus of any one of embodiments 1 to 20, wherein said coating promotes adhesion of solids from said slurry to said filter plate (1101), prevents adhesion of solids from said slurry to said filter plate (1101), prevents corrosion of said filter plate (1101), or prevents solvation of said filter plate (1101) by liquids from said slurry.

Embodiment 22. The apparatus of any one of embodiments 1 to 21, wherein said coating is selected from the group consisting of hydrophilic coatings, hydrophobic coatings, and anti-corrosion coatings, and combinations thereof.

Embodiment 23. The apparatus of any one of embodiments 1 to 22, further comprising a bearing that supports said inner plate.

Embodiment 24. The apparatus of any one of embodiments 1 to 23, further comprising a screw cap that applies a biasing force on said inner plate to position said inner plate at a desired location along its axis, within said housing.

Embodiment 25. The apparatus of any one of embodiments 1 to 24, further comprising a magnet that applies a biasing force on said inner plate to position said inner plate at a desired location along its axis, within said housing.

Embodiment 26. The apparatus of any one of embodiments 1 to 25, wherein said magnet is an electromagnet or a permanent magnet.

Embodiment 27. The apparatus of any one of embodiments 1 to 27, wherein said inner plate rotator comprises an external drive unit for rotating said inner plate.

Embodiment 28. The apparatus of any one of embodiments 1 to 27, wherein said inner plate is coupled to said external drive unit through a gear (1202).

Embodiment 29. The apparatus of any one of embodiments 1 to 28, further comprising a motor (1201) for rotating said inner plate.

Embodiment 30. The apparatus of any one of embodiments 1 to 29, wherein said inner plate is coupled to said external drive unit through a drive shaft.

Embodiment 31. The apparatus of any one of embodiments 1 to 30, wherein said inner plate rotator comprises a magnetic coupling for rotating said inner plate.

Embodiment 32. The apparatus of any one of embodiments 1 to 31, wherein said inner plate rotator further comprises a rotation controller for controlling a rotational speed of said inner plate.

Embodiment 33. The apparatus of any one of embodiments 1 to 32, wherein said inner plate rotator further comprises a speed sensor (1705) for measuring a rotational speed of said inner plate.

Embodiment 34. The apparatus of any one of embodiments 1 to 33, wherein said inner plate comprises a filter support plate (1104) and a bottom vacuum plate (1105).

Embodiment 35. The apparatus of any one of embodiments 1 to 34, wherein said filter support plate (1104) comprises a plurality of holes adapted to convey said filtrate through said filter support plate (1104) onto said bottom vacuum plate (1105).

Embodiment 36. The apparatus of any one of embodiments 1 to 35, further comprising a center shaft (1106) in fluid communication with said bottom vacuum plate and said filtrate outlet (1107), wherein the apparatus is adapted to convey said filtrate from said bottom vacuum plate (1105) through said center shaft (1106) to said filtrate outlet.

Embodiment 37. The apparatus of any one of embodiments 1 to 36, further comprising a pressure equalizer for equalizing a pressure drop within said housing as gas within said housing is drawn into said inner plate through said filter plate (1101).

Embodiment 38. The apparatus of any one of embodiments 1 to 37, wherein said pressure equalizer comprises an orifice through which gas flowing through said filtrate outlet (1107) is drawn.

Embodiment 39. The apparatus of any one of embodiments 1 to 38, wherein said orifice is located in proximity to said porous surface of said filter plate (1101).

Embodiment 40. The apparatus of any one of embodiments 1 to 39, further comprising a plurality of fluid channels on said inner plate in fluid communication with a cavity, and a plurality of filtrate tubes in fluid communication with said cavity and said filtrate outlet (1107), wherein a plate fixedly attached to said housing separates said cavity into an upper portion and a lower portion wherein said upper and lower portions are connected by said orifice.

Embodiment 41. The apparatus of any one of embodiments 1 to 40, wherein said pressure equalizer further comprises a pressure controller and a pressure sensor.

Embodiment 42. The apparatus of any one of embodiments 1 to 41, further comprising a slurry flow meter for measuring a rate of flow of said slurry from said feed and solvent wash assembly (1300).

Embodiment 43. The apparatus of any one of embodiments 1 to 42, further comprising a slurry flow meter for measuring a rate of flow of said slurry from said oscillating deposit tube (1310) or said slurry line (1306).

Embodiment 44. The apparatus of any one of embodiments 1 to 43, further comprising a slurry inlet valve, and a slurry inlet valve controller.

Embodiment 45. The apparatus of any one of embodiments 1 to 44, further comprising a filtrate flow meter.

Embodiment 46. The apparatus of any one of embodiments 1 to 45, further comprising a feedback loop that controls said stream of slurry to maintain a constant thickness of said filter cake on said filter plate (1101).

Embodiment 47. The apparatus of any one of embodiments 1 to 46, wherein said feedback loop comprises a sensor to measure thickness of said filter cake on said filter plate (1101).

Embodiment 48. The apparatus of any one of embodiments 1 to 47, wherein said sensor is not in direct physical contact with said filter cake.

Embodiment 49. The apparatus of any one of embodiments 1 to 48, wherein said sensor is selected from the group consisting of a laser sensor (1702), an ultrasonic sensor, and a UV-Vis reflective optical sensor.

Embodiment 50. The apparatus of any one of embodiments 1 to 49, wherein said sensor measures the thickness of said filter cake at any radial position on said filter plate (1101).

Embodiment 51. The apparatus of any one of embodiments 1 to 50, wherein said sensor measures the thickness of said filter cake at multiple radial positions on said filter plate (1101) simultaneously.

Embodiment 52. The apparatus of any one of embodiments 1 to 51, further comprising a feed-forward loop that controls said slurry wash block (1305).

Embodiment 53. The apparatus of any one of embodiments 1 to 52, wherein said feed-forward loop comprises a sampling port for removing a sample of said filter cake.

Embodiment 54. The apparatus of any one of embodiments 1 to 53, wherein said feed-forward loop comprises a detector for detecting impurities in said filter cake.

Embodiment 55. The apparatus of any one of embodiments 1 to 54, wherein said detector comprises an optical sensor.

Embodiment 56. The apparatus of any one of embodiments 1 to 55, wherein said detector comprises a colorimeter, an NIR sensor, or an FTIR sensor.

Embodiment 57. The apparatus of any one of embodiments 1 to 56, further comprising a vision system camera (1701) for measuring the width of said filter cake on said filter plate (1101).

Embodiment 58. The apparatus of any one of embodiments 1 to 57, further comprising an ultrasonic system for measuring the width of said filter cake on said filter plate (1101).

Embodiment 59. The apparatus of any one of embodiments 1 to 58, further comprising a vacuum pump connected to said filtrate outlet (1107).

Embodiment 60. The apparatus of any one of embodiments 1 to 59, wherein said wash solvent block (1302) comprises one or more nozzles for applying a washing solvent to said filter cake, selected from the group consisting of drip nozzles, pneumatic spray nozzles, non-pneumatic misting nozzles, electrospray nozzles, ultrasonic spray nozzles, and ultrasonic nebulizers.

Embodiment 61. The apparatus of any one of embodiments 1 to 60, wherein said one or more nozzles are configured to provide a homogeneous distribution of said washing solvent.

Embodiment 62. The apparatus of claim 1, further comprising an in-line cleaner for cleaning one or more components of said apparatus.

Embodiment 63. The apparatus of any one of embodiments 1 to 62, wherein said in-line cleaner comprises one or more nozzles for applying a cleaning solvent to said filter plate (1101), selected from the group consisting of drip nozzles, pneumatic spray nozzles, non-pneumatic misting nozzles, electrospray nozzles, ultrasonic spray nozzles, and ultrasonic nebulizers Embodiment 64. The apparatus of any one of embodiments 1 to 63, wherein one or more components of said apparatus are compatible with a solvent selected from the group consisting of acetone, acetonitrile, benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, dimethyl sulfoxide, ethanol ethyl acetate, heptane, hexane, methanol, methyl t-butyl ether, methyl isobutyl ketone, methylene chloride, N-methyl-2-pyrrolidinone, nitromethane, pentane, ligroine, tetrahydrofuran, toluene, triethylamine, o¬-xylene, m-xylene, p¬-xylene, and combinations thereof.

Embodiment 65. The apparatus of any one of embodiments 1 to 64, wherein one or more components of said apparatus are fabricated from one or more sterilizable materials.

Embodiment 66. The apparatus of any one of embodiments 1 to 65, wherein the sterilizable materials are sterilizable using ethylene oxide, hydrogen peroxide, alcohol, soap, acetone, steam, gamma radiation, electron beam radiation, or light.

Embodiment 67. The apparatus of any one of embodiments 1 to 66, wherein one or more components of said apparatus are fabricated from one or more regulatory-compliant materials.

Embodiment 68. The apparatus of any one of embodiments 1 to 67, wherein one or more components of said apparatus are fabricated from one or more chemically-inert materials.

Embodiment 69. The apparatus of any one of embodiments 1 to 68, wherein one or more components of said apparatus are fabricated from a material selected from the group consisting of stainless steel, nickel-based alloys, borosilicate glass, ceramics, and combinations thereof.

Embodiment 70. The apparatus of any one of embodiments 1 to 69, wherein said scraper (1403) comprises a material selected from the group consisting of polymer, metal, ceramic, and wood.

Embodiment 71. The apparatus of any one of embodiments 1 to 70, wherein said scraper (1403) comprises a material selected from the group consisting of polyoxymethylene, polymethylpentene, perfluoroalkoxy, polytetrafluoroethylene, high-density polyethylene, high molecular weight polyethylene, ultra-high molecular weight polyethylene, polypropylene, high molecular weight polypropylene, ultra-high molecular weight polypropylene, stainless steel, and combinations thereof.

Embodiment 72. The apparatus of any one of embodiments 1 to 71, further comprising a gas inlet, whereby a gas is drawn into said housing to dry said filter cake.

Embodiment 73. The apparatus of any one of embodiments 1 to 72, wherein said gas inlet is located on a side of said housing.

Embodiment 74. The apparatus of any one of embodiments 1 to 73, wherein said gas is air.

Embodiment 75. The apparatus of any one of embodiments 1 to 74, wherein said air is dry.

Embodiment 76. The apparatus of any one of embodiments 1 to 75, wherein said gas is inert.

Embodiment 77. The apparatus of any one of embodiments 1 to 76, wherein said inert gas is nitrogen or argon.

Embodiment 78. The apparatus of any one of embodiments 1 to 77, wherein said scraper (1403) comprises a blade or a brush.

Embodiment 79. The apparatus of any one of embodiments 1 to 78, wherein the distance between said scraper (1403) and said filter plate (1101) is adjustable.

Embodiment 80. The apparatus of any one of embodiments 1 to 79, wherein the distance between said scraper (1403) and said filter plate (1101) is adjustable automatically.

Embodiment 81. The apparatus of any one of embodiments 1 to 80, further comprising a compressed gas source and a compressed gas inlet for removing said filter cake from said filter plate (1101).

Embodiment 82. The apparatus of any one of embodiments 1 to 81, wherein said compressed gas inlet is located in proximity to said porous surface of said filter plate (1101).

Embodiment 83. The apparatus of any one of embodiments 1 to 82, wherein said compressed gas is air.

Embodiment 84. The apparatus of any one of embodiments 1 to 83, wherein said compressed air is dry.

Embodiment 85. The apparatus of any one of embodiments 1 to 84, wherein said compressed gas is inert.

Embodiment 86. The apparatus of any one of embodiments 1 to 85, wherein said compressed inert gas is nitrogen or argon.

Embodiment 87. The apparatus of any one of embodiments 1 to 86, further comprising a plunger for removing said filter cake from said filter plate (1101).

Embodiment 88. The apparatus of any one of embodiments 1 to 87, further comprising an auger (1402) for conveying said removed filter cake.

Embodiment 89. The apparatus of any one of embodiments 1 to 88, wherein said auger (1402) conveys said removed filter cake towards said filter cake outlet (1102).

Embodiment 90. The apparatus of any one of embodiments 1 to 89, wherein said auger (1402) conveys said removed filter cake in a direction centripetal to the rotation of the inner plate.

Embodiment 91. The apparatus of any one of embodiments 1 to 90, wherein said auger (1402) conveys said removed filter cake in a direction centrifugal to the rotation of the inner plate.

Embodiment 92. The apparatus of any one of embodiments 1 to 91, wherein said auger (1402) is driven by direct coupling to an external auger motor (1501).

Embodiment 93. The apparatus of any one of embodiments 1 to 92, further comprising an auger speed sensor (1703) for measuring a rotational speed of said auger (1402).

Embodiment 94. The apparatus of any one of embodiments 1 to 93, wherein said filter cake outlet (1102) is oriented vertically or horizontally.

Embodiment 95. The apparatus of any one of embodiments 1 to 94, wherein said filter cake outlet (1102) widens as it lengthens.

Embodiment 96. The apparatus of any one of embodiments 1 to 95, wherein said filter cake outlet (1102) is located along one side of said housing.

Embodiment 97. The apparatus of any one of embodiments 1 to 96, further comprising a slurry distributor (1304) that homogeneously distributes said slurry over said surface of said filter plate (1101).

Embodiment 98. The apparatus of any one of embodiments 1 to 97, wherein said slurry distributor (1304) is adjustable to control the thickness of said filter cake.

Embodiment 99. The apparatus of any one of embodiments 1 to 98, wherein said slurry distributor (1304) is adjustable to a distance from said filter plate (1101) of 0.2 mm to 25 mm.

Embodiment 100. The apparatus of any one of embodiments 1 to 99, wherein said slurry distributor (1304) is adjustable to a distance from said filter plate (1101) of 0.2 mm to 5 mm.

Embodiment 101. The apparatus of any one of embodiments 1 to 100, further comprising a filter plate retaining ring (1103) that secures said filter plate (1101) to said inner plate.

Embodiment 102. The apparatus of any one of embodiments 1 to 101, wherein said filter plate retaining ring (1103) comprises an overflow lip that limits the thickness of said filter cake on said filter plate (1101).

Embodiment 103. The apparatus of any one of embodiments 1 to 102, wherein the overflow lip extends 5 mm to 50 mm from said porous surface of said filter plate (1101).

Embodiment 104. The apparatus of any one of embodiments 1 to 103, further comprising an in-line sterilizer for the sterilization of one or more components of said apparatus.

Embodiment 105. The apparatus of any one of embodiments 1 to 104, wherein one or more components of said apparatus are sterile.

Embodiment 106. The apparatus of any one of embodiments 1 to 105, further comprising a feed-backward loop that comprises a cake height sensor (1702) that controls the inlet volumetric feed rate.

Embodiment 107. A method of continuously filtering a stream of slurry comprising: a) providing a slurry to a slurry feed and solvent wash assembly (1300) of an apparatus comprising: a housing; a slurry feed and solvent wash assembly (1300); a removable, rotatable filter plate (1101) having a porous surface for receiving said slurry from said slurry feed and solvent wash assembly (1300); a rotatable inner plate supporting said filter plate (1101); an inner plate rotator for rotating said inner plate; a filtrate outlet (1107) in fluid communication with said filter plate (1101) adapted to convey said filtrate from said housing; a scraper (1403) for removing a solid filter cake from said filter plate (1101); and a filter cake outlet (1102) adapted to convey said filter cake from said housing; b) rotating said filter plate (1101); c) filtering said slurry through said filter plate (1101) to form a filtrate and a solid filter cake; d) passing said filtrate through said filtrate outlet (1107); removing said filter cake from said filter plate (1101); and passing said filter cake through said filter cake outlet (1102).

Embodiment 108. The method of embodiment 107, wherein said continuous filtering is at steady state with respect to the incoming flow rate of said slurry, the concentration of said slurry, the composition of said slurry, and combinations thereof.

Embodiment 109. The method of embodiment 107 or 108, wherein said slurry feed and solvent wash assembly (1300) comprises one or more of a solvent spray nozzle, a slurry wash block (1305), a wash solvent block (1302), or combinations thereof.

Embodiment 110. The method of any one of embodiments 107 to 109, wherein said slurry feed and solvent wash assembly (1300) comprises an oscillating deposition tube (1310) or a slurry feed block (1301).

Embodiment 111. The method of any one of embodiments 107 to 110, wherein said slurry is processed continuously for at least 1 hour.

Embodiment 112. The method of any one of embodiments 107 to 111, wherein said slurry is processed continuously for at least 1 day.

Embodiment 113. The method of any one of embodiments 107 to 112, wherein said slurry is processed continuously for at least 1 week.

Embodiment 114. The method of any one of embodiments 107 to 113, wherein said slurry is processed continuously for at least 1 month.

Embodiment 115. The method of any one of embodiments 107 to 114, wherein said slurry is provided continuously for at least 1 year.

Embodiment 116. The method of any one of embodiments 107 to 115, wherein said inner plate rotates at 15 rpm or less.

Embodiment 117. The method of any one of embodiments 107 to 116, wherein said inner plate rotates at 10 rpm or less.

Embodiment 118. The method of any one of embodiments 107 to 117, wherein said inner plate rotates at 5 rpm or less.

Embodiment 119. The method of any one of embodiments 107 to 118, wherein said inner plate rotates at 1 rpm or less.

Embodiment 120. The method of any one of embodiments 107 to 119, wherein said inner plate rotates at 0.5 rpm or less.

Embodiment 121. The method of any one of embodiments 107 to 120, wherein said inner plate rotates at 0.1 rpm or less.

Embodiment 122. The method of any one of embodiments 107 to 121, wherein said inner plate rotates at 0.075 rpm.

Embodiment 123. The method of any one of embodiments 107 to 122, further comprising washing said filter cake with a washing solvent.

Embodiment 124. The method of any one of embodiments 107 to 123, further comprising passing said washing solvent through said filtrate outlet (1107).

Embodiment 125. The method of any one of embodiments 107 to 124, wherein the ratio of the mass flow rate of said slurry to the mass flow rate of said washing solvent is about 10:1 to about 1:10.

Embodiment 126. The method of any one of embodiments 107 to 125, wherein the ratio of the mass flow rate of said slurry to the mass flow rate of said washing solvent is about 5:1 to about 1:5.

Embodiment 127. The method of any one of embodiments 107 to 126, wherein the ratio of the mass flow rate of said slurry to the mass flow rate of said washing solvent is about 2:1 to about 1:2.

Embodiment 128. The method of any one of embodiments 107 to 127, wherein said apparatus outputs 1 g to 1500 kg of filter cake per hour.

Embodiment 129. The method of any one of embodiments 107 to 128, wherein said apparatus outputs 10 g to 10 kg of filter cake per hour.

Embodiment 130. The method of any one of embodiments 107 to 129, wherein said apparatus outputs 100 g to 1 kg of filter cake per hour.

Embodiment 131. The method of any one of embodiments 107 to 130, wherein said slurry and said washing solvent are at a temperature of −10° C. to 100° C.

Embodiment 132. The method of any one of embodiments 107 to 131, wherein said processing is carried out at an elevated temperature.

Embodiment 133. The method of any one of embodiments 107 to 132, wherein said slurry and said washing solvent are at a temperature of 25° C. to 100° C.

Embodiment 134. The method of any one of embodiments 107 to 133, wherein said slurry and said washing solvent are at a temperature of 50° C. to 100° C.

Embodiment 135. The method of any one of embodiments 107 to 134, wherein said slurry and said washing solvent are at a temperature of 75° C. to 100° C.

Embodiment 136. The method of any one of embodiments 107 to 135, further comprising cleaning said filter plate (1101) with a cleaning solvent.

Embodiment 137. The method of any one of embodiments 107 to 136, wherein said apparatus further comprises an auger (1402) for conveying said removed filter cake to said filter cake outlet (1102) and said filter cake is conveyed to filter cake outlet (1102).

Embodiment 138. The method of any one of embodiments 107 to 137, wherein said auger (1402) conveys said removed filter cake in a direction centripetal to the rotation of the inner plate.

Embodiment 139. The method of any one of embodiments 107 to 138, wherein said auger (1402) is driven by direct coupling to an external auger motor (1501).

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

While the present disclosure has been described with reference to particular aspects, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope of the present disclosure.

EXAMPLES

Example 1

General Operation of Continuous Rotary Plate Filter

Prior to operating the continuous rotary plate filter, the solvent wash vessels and slurry tank are filled, the solvent pumps are primed, and the apparatus is checked for any obstructions prohibiting filtrate collection. The main power switch to the system is turned on, followed by the switches to power the auger and plate motors. The auger motor and plate motor are set at their desired speeds. The filter plate wash flow and wet-cake wash flow are set at their desired rates. The laser sensor and vision systems are turned on through the control system. The vacuum pump is turned on. The plate motor and auger motor are turned on through the control system. The filter plate and wet-cake wash pumps are turned on. The slurry feed pump is set to the desired rate. Wet cake is collected by the combined action of the scraper blade and rotating auger, an then transported centripetally, where it exits through the filter cake outlet.

Typical operation conditions are: API concentration—6 wt % in 20:1 ethyl acetate:ethanol; filter plate porosity (D90)—1.0 µm; vacuum pressure (gauge)—20 Hg; volumetric flow rate—50 ml/min; residence time—1 min (0.75 rpm); solvent wash flow rate—1:1 mass flow of API:mass flow of wash solvent.

To shut down the continuous rotary plate filter after the desired amount of mass flow has passed, the slurry feed pump and auger motor are halted while continuing to let the two solvent washes run for an additional 5 minutes to clean out the system. The wash pumps, the vacuum pump, the plate motor, and finally the main power switch are turned off. The product is retrieved from the collection vessel.

Example 2

Evaluation of Slurry Purity

Slurry purity is evaluated as a function of residence time, wash type, wash rate, and filter cake thickness through HPLC analysis. Table 1 lists the specific factors that are tested, and under what conditions.

TABLE 1

| Factor Tested | Specific Tests/Conditions |
| --- | --- |
| Filter cake thickness | Slurry purity at different filter cake thickness (1-5 mm) for a given wash ratio<br>Filter cake thickness as function of slurry mass flow rate & filter plate rotational speed (1-5 rpm)<br>Repeated with at least 3 pharmaceuticals with different physicochemical properties to assess process performance |
| Residence time | Residence times tested included: 15 seconds, 30 seconds, 60 seconds, 120 seconds, and 180 seconds |
| Type of wash | Different wash delivery systems were evaluated: drip wash, and spray nozzle<br>Different wash solvents were evaluated: ethyl acetate, ethanol, methanol, water, and combinations thereof<br>The number of wash zones was evaluated: 0-4 wash zones |
| Wash Ratio | Slurry purity at different solvent wash ratio (mass flow rate slurry:mass flow rate wash = 1:1, 1:2, 1:3, etc.) for a given filter cake thickness<br>Repeated with at least 3 pharmaceuticals with different physicochemical properties to assess process performance |
| Unit Robustness | Filtration unit is run continuously 24/7 for one month to assess mechanical resistance |

Example 3

Effect of Slurry Loading on Filter Cake Thickness

Figure 9:
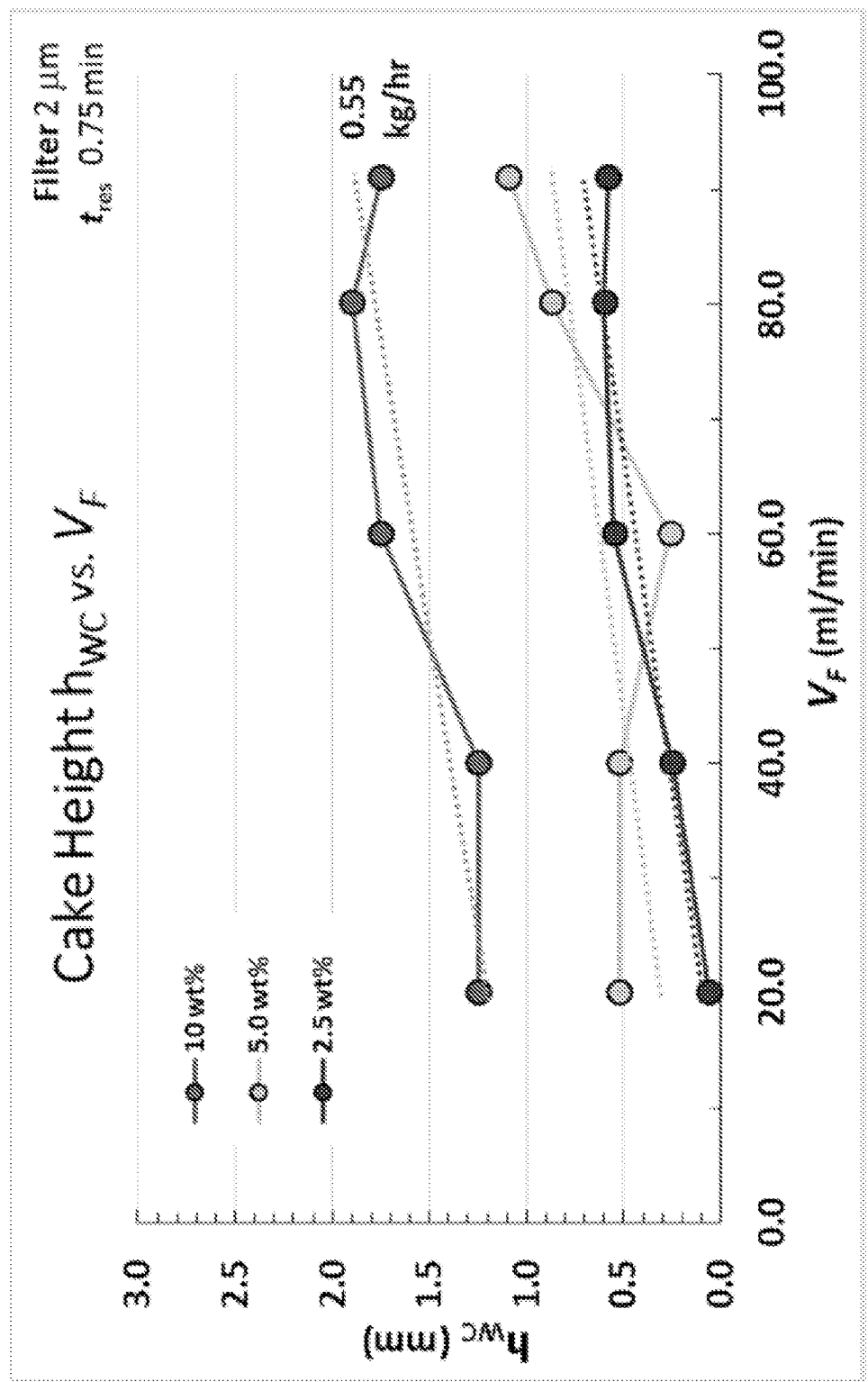
FIG. 9 is a graph of wet-cake thickness ($h_{WC}$) vs. slurry volumetric flowrate ($V_F$) for three slurries having different solid wt % (10 wt %, 5 wt %, and 2.5 wt %).

An exemplary continuous rotary plate filter apparatus is evaluated to determine the effect of slurry loading (solid wt % and volumetric flow rate $V_F$) on filter cake thickness. FIG. 9 shows how the filter cake thickness increases with slurry solid loading, which is expected as more material is deposited on the filter surface. Similarly, the figure shows a gradual increase in thickness as the volumetric flow rate is increased.

Example 4

Effect of Residence Time on Filter Cake Thickness

Figure 10:
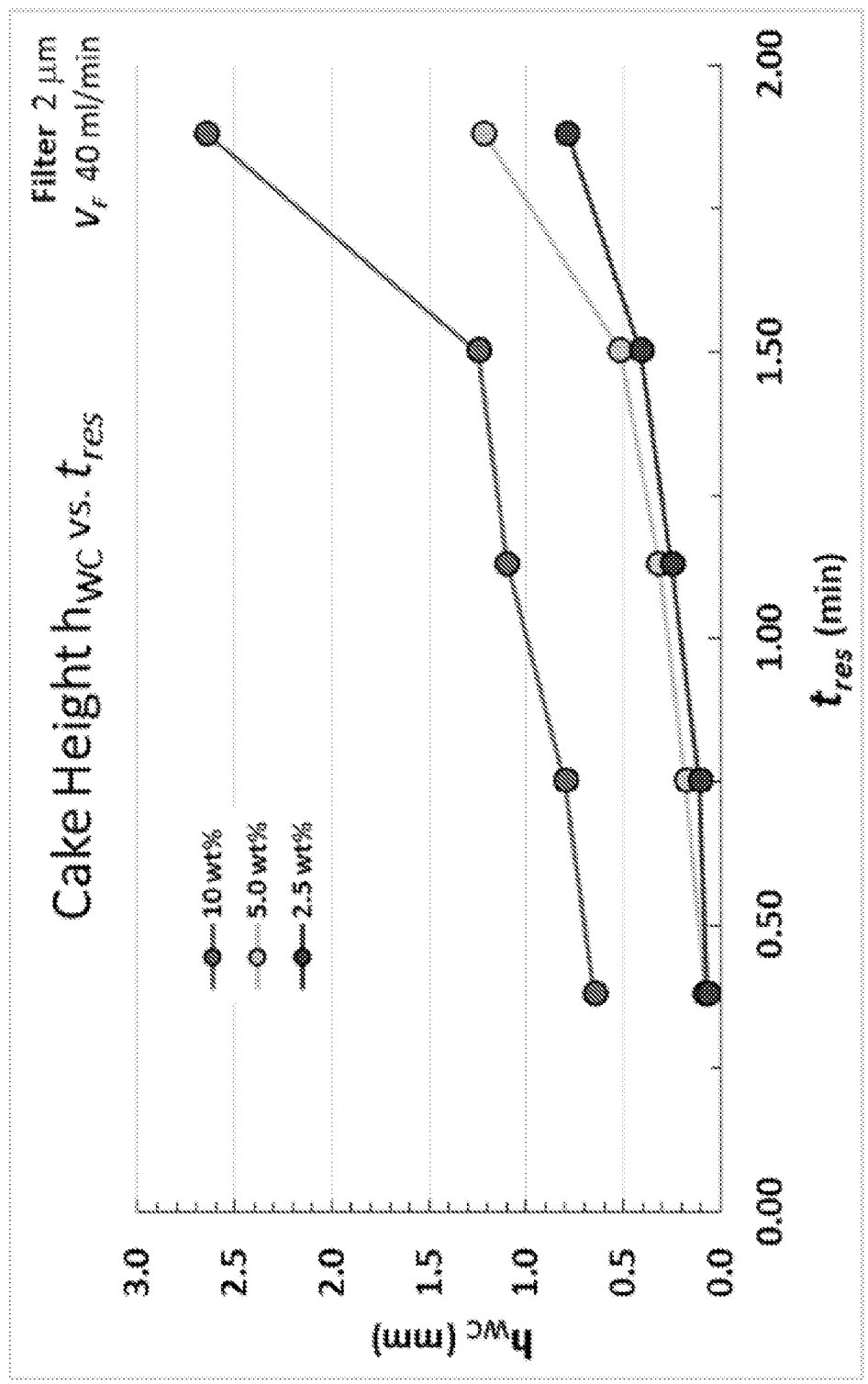
FIG. 10 is a graph of wet-cake thickness ($h_{WC}$) vs. process residence time ($t_{res}$) for three slurries having different solid wt % (10 wt %, 5 wt %, and 2.5 wt %).

An exemplary continuous rotary plate filter apparatus is evaluated to determine the effect of process residence time on filter cake thickness. The cake thickness varies by changing the process residence time, i.e. the slower the process (increases residence time), the greater the thickness (see FIG. 10). That is because the material has more time to build its microstructural layer as it is deposited on the filter plate, while the cake width remains relatively constant. It is important to highlight that the scraper blade applied minimal pressure through a passive mechanism that allows the filter cake to increase in height as the rotational velocity is decreased.

Example 5

Effect of Slurry Loading on Filter Performance

Figure 11:
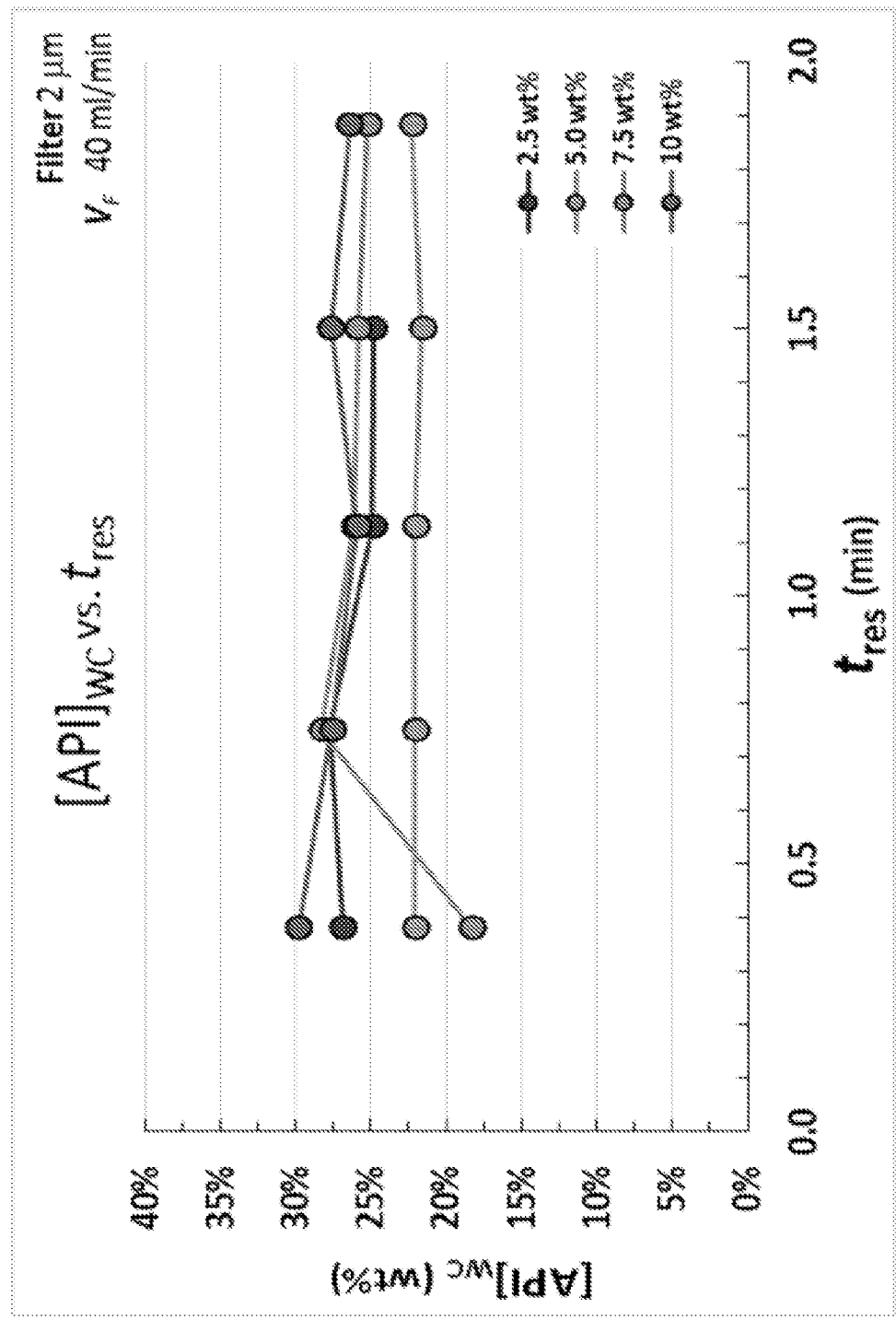
FIG. 11 is a graph of API wet-cake concentration ($[API]_{WC}$) vs. process residence time ($t_{res}$) for four slurries having different initial API solid wt % (10 wt %, 7.5 wt %, 5 wt %, and 2.5 wt %).
Figure 12:
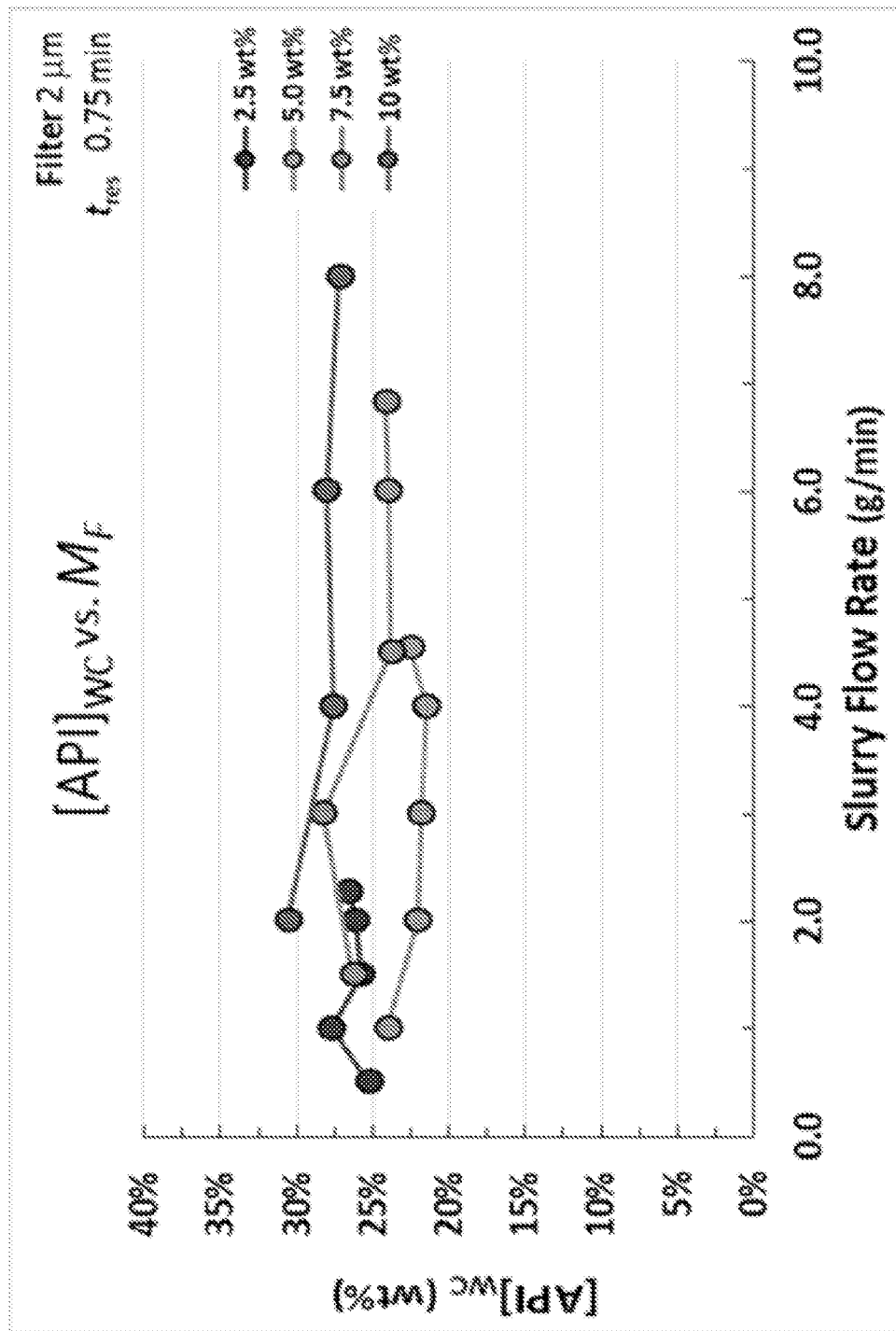
FIG. 12 is a graph of API wet-cake concentration ($[API]_{WC}$) vs. API mass flow rate ($M_F$) for four slurries having different initial API solid wt % (10 wt %, 7.5 wt %, 5 wt %, and 2.5 wt %).

An exemplary continuous rotary plate filter apparatus is evaluated to determine the effect of slurry loading on the ability of the apparatus to remove the liquid phase from the slurry. The performance of the filtration system is excellent. FIGS. 11 and 12 show how the filter effectively removes the liquid phase from the slurry at different API initial solid wt % (ranging from 2.5 wt % to 10 wt %) by varying the residence time or the slurry flow rate. FIG. 11 shows that the final API filter cake solid concentration ($[API]_{WC}$) is consistently ~25 wt %, irrespective of the initial API wt %. Similarly, $[API]_{WC}$ does not vary with the process residence time ($t_{res}$, FIG. 11), or the mass flow rate of the API onto the filter ($M_F$, FIG. 12). Not to be limited by theory it is thought that the even distribution of the slurry into a thin layer allows the liquid phase to be filtered very effectively (i.e. short flow path through a wet-cake of ~1 mm in thickness) and very rapidly (i.e. time required for filtration through the wet-cake<<process/residence time).

Example 6

Effect of Pore Size on Filter Performance

Figure 13:
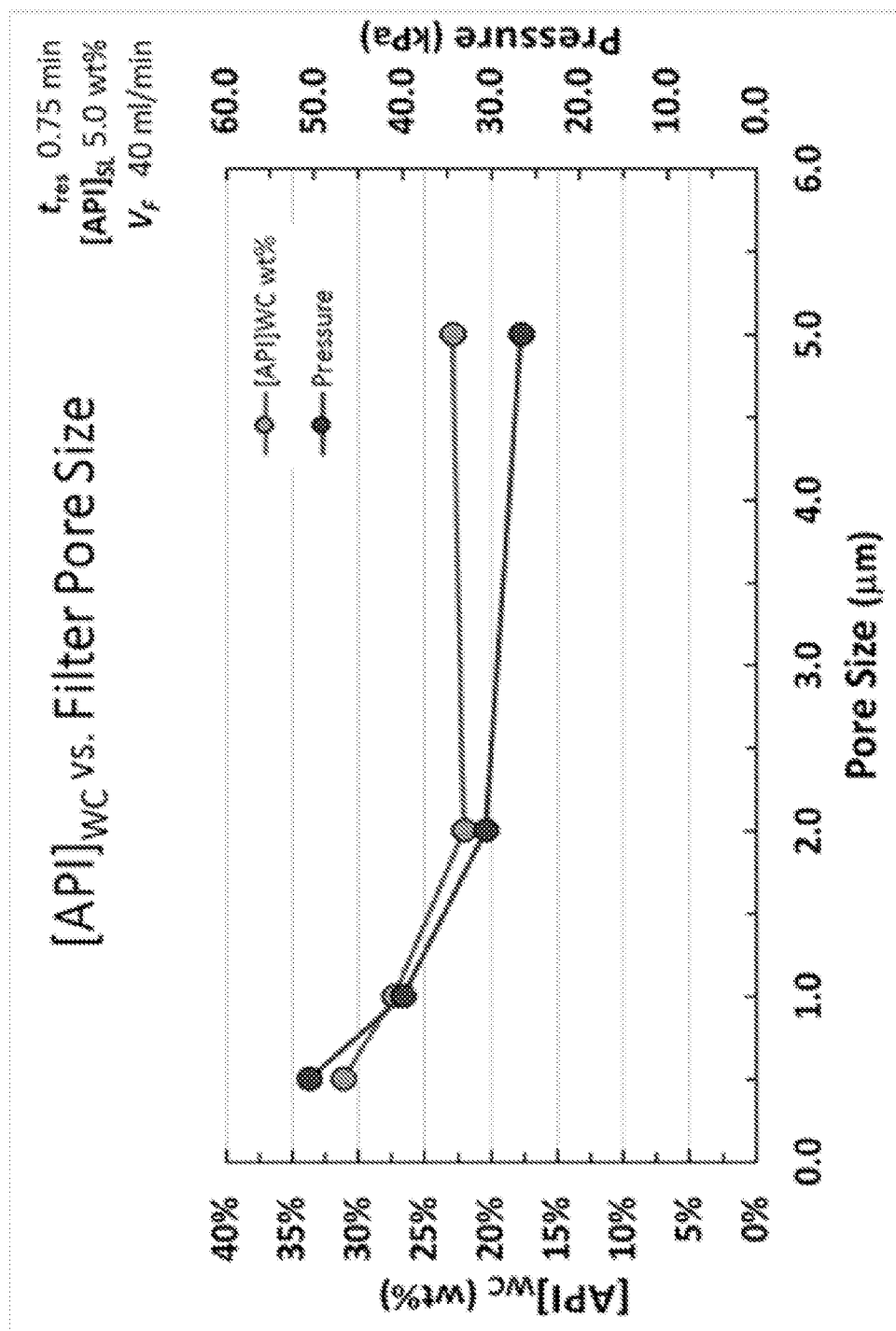
FIG. 13 is a graph showing the effect of filter plate pore size on API wet-cake concentration ($[API]_{WC}$) and filtration pressure.

An exemplary continuous rotary plate filter apparatus is evaluated to determine the effect of the filter plate pore size on filter performance. By decreasing the filter plate pore size, filtration performance is improved by almost 10% (FIG. 13). More specifically $[API]_{WC}$ increased from 22 wt % with 2-5 µm pore plates to 32 wt % with a 0.5 µm pore plate. Not to be limited by theory it is thought that this is due to a greater pressure differential that is generated across the plate with smaller pores (see FIG. 13).

Example 7

Effect of Washing on Product Purity

The continuous rotary plate filter apparatus described herein is also very effective in removing impurities from the filter cake due to the distribution of the slurry into a thin layer. However, it is also important to have in place an effective cake washing mechanism.

Figure 14:
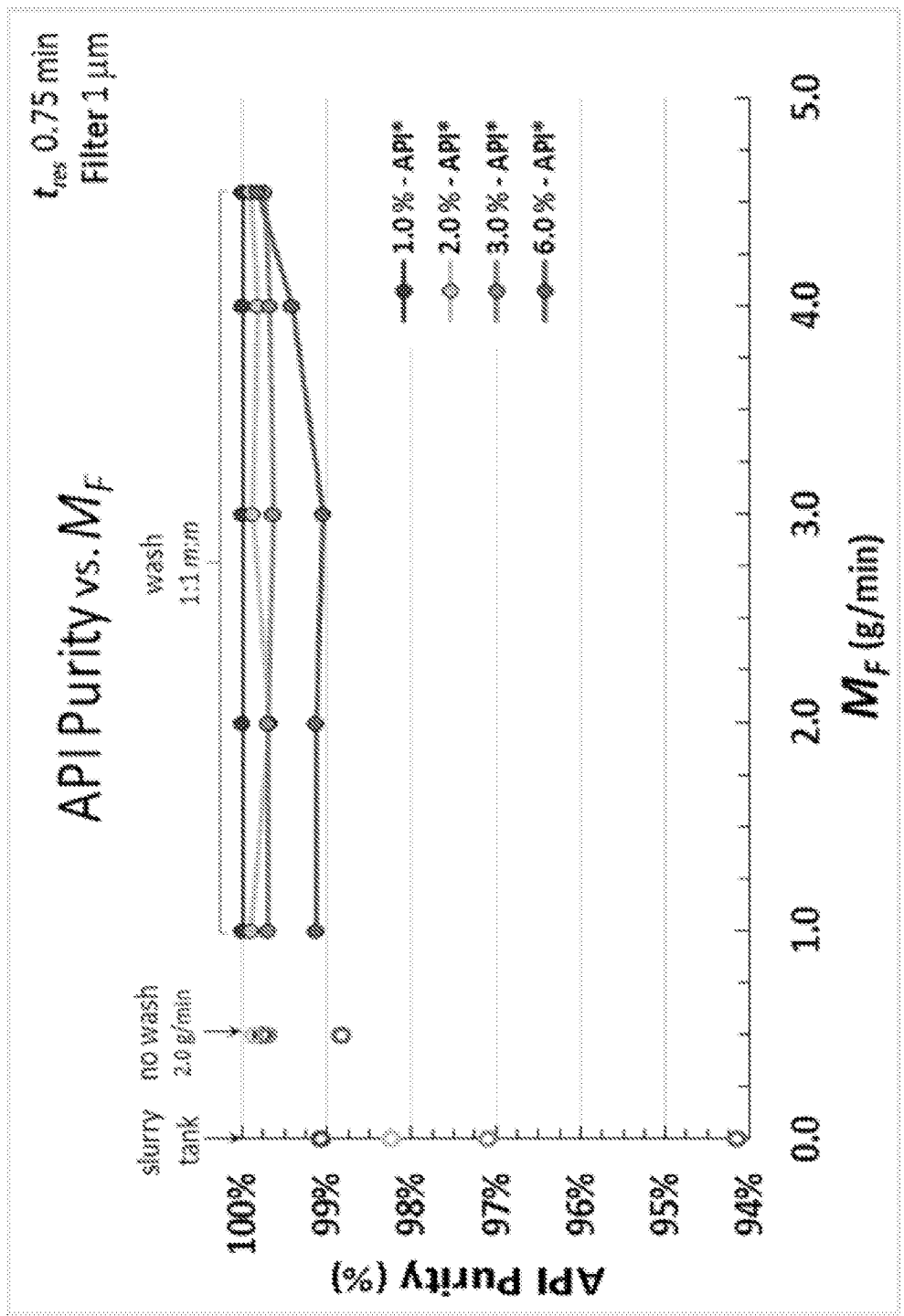
FIG. 14 is a graph of final API purity as a function of API mass flow rate ($M_F$) for four slurries having different initial concentrations of total impurities (1%, 2%, 3%, and 6%).
Figure 15A:
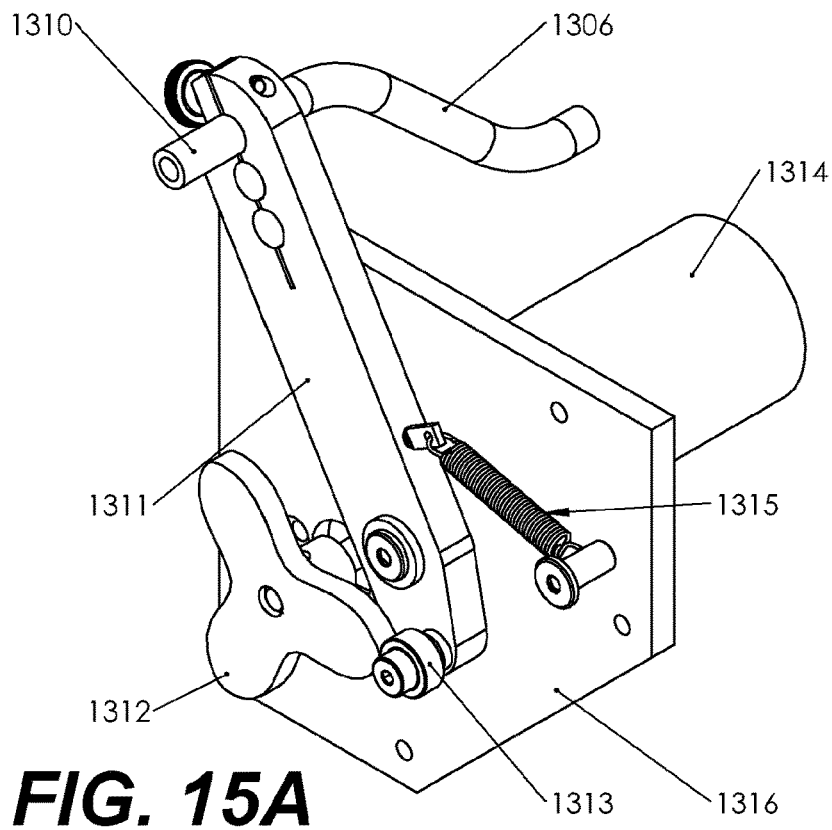
FIG. 15A-E depicts a feed and solvent wash assembly (1300) according to an aspect of the present disclosure showing an oscillating deposition tube (1310) coupled to a slurry line (1306) and comprising a mounting plate (1316); a rotatable arm (1311) having a cam translating follower (1313) in contact with a rotating cam (1312) connected to a motor (1314).
Figure 15B:
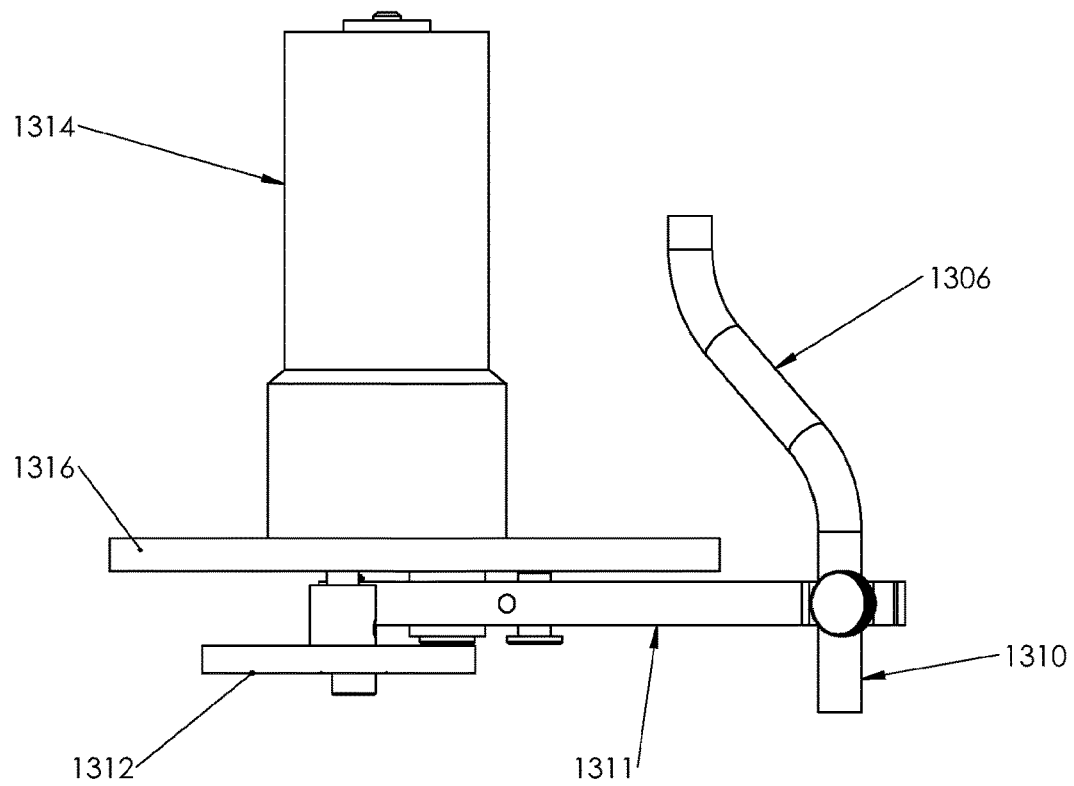
Figure 15C:
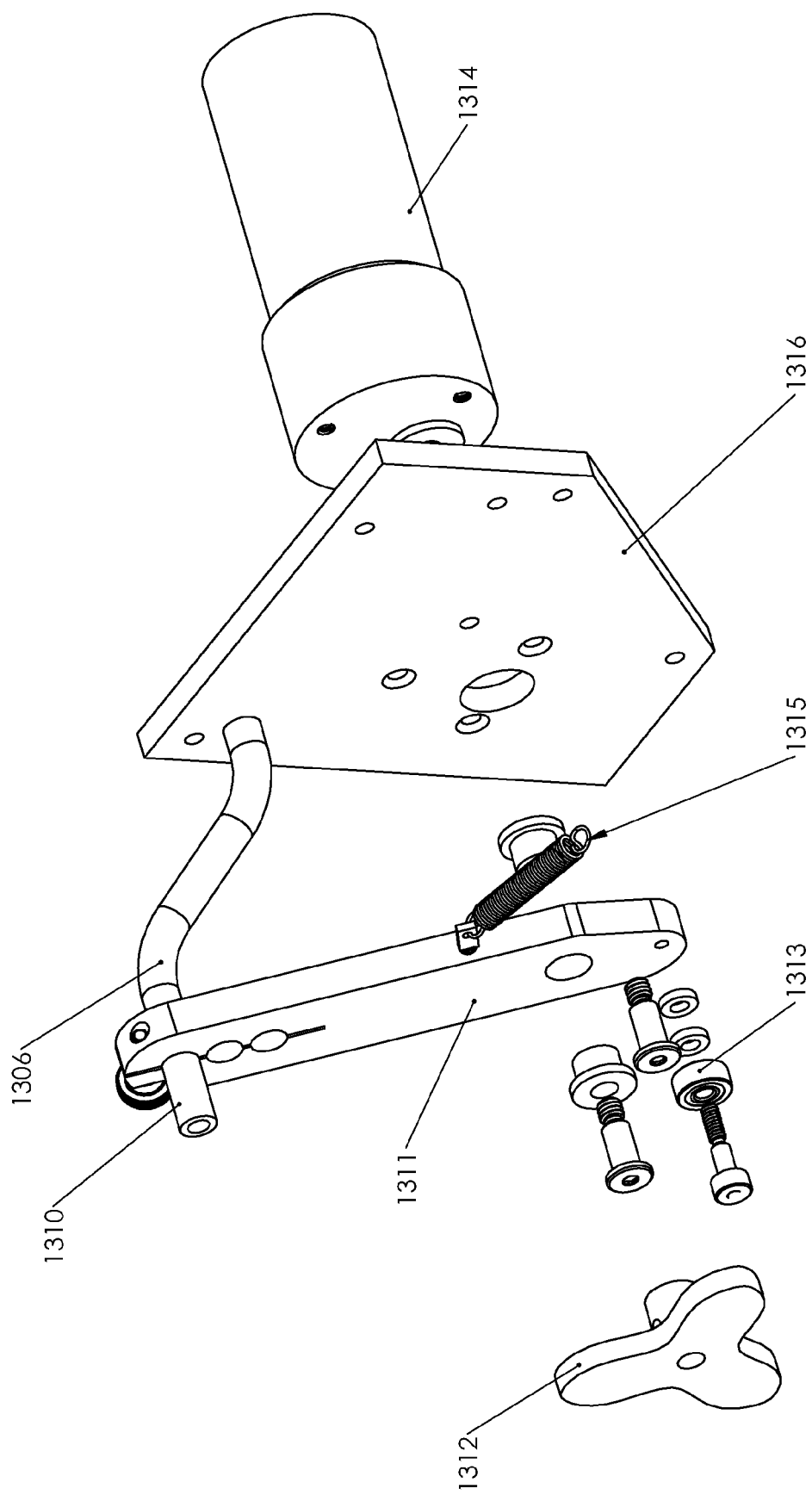
Figure 15D:
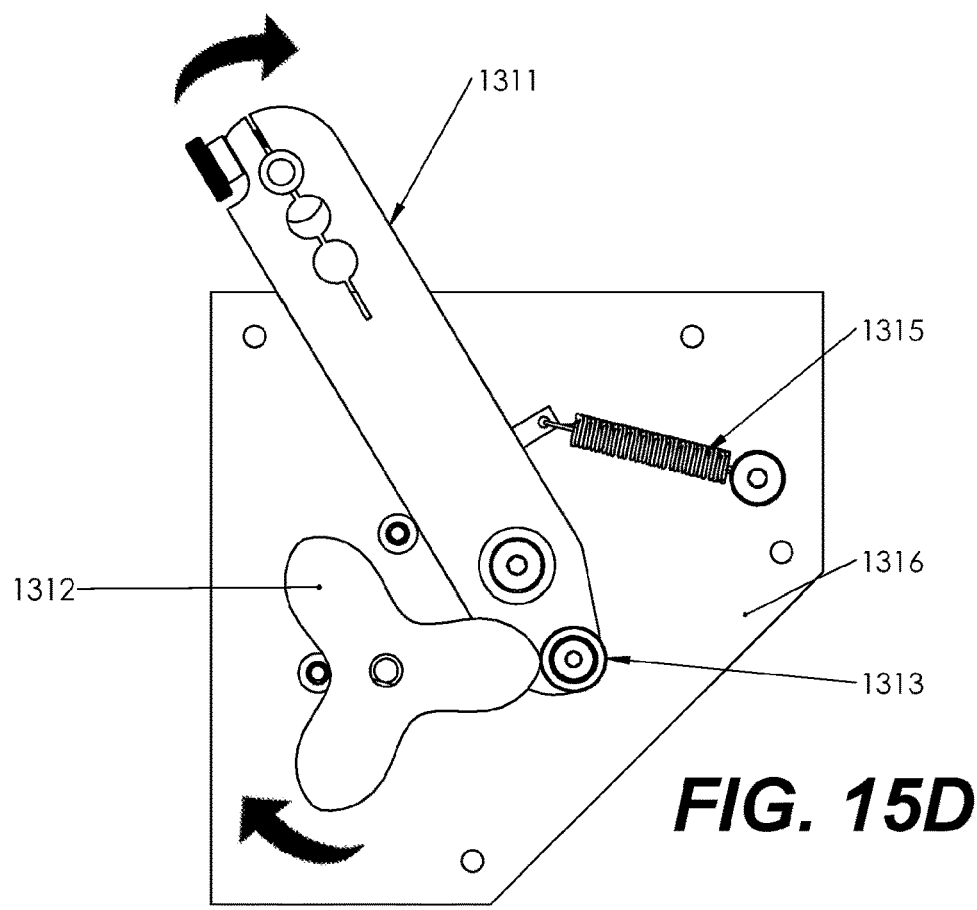
Figure 15E:
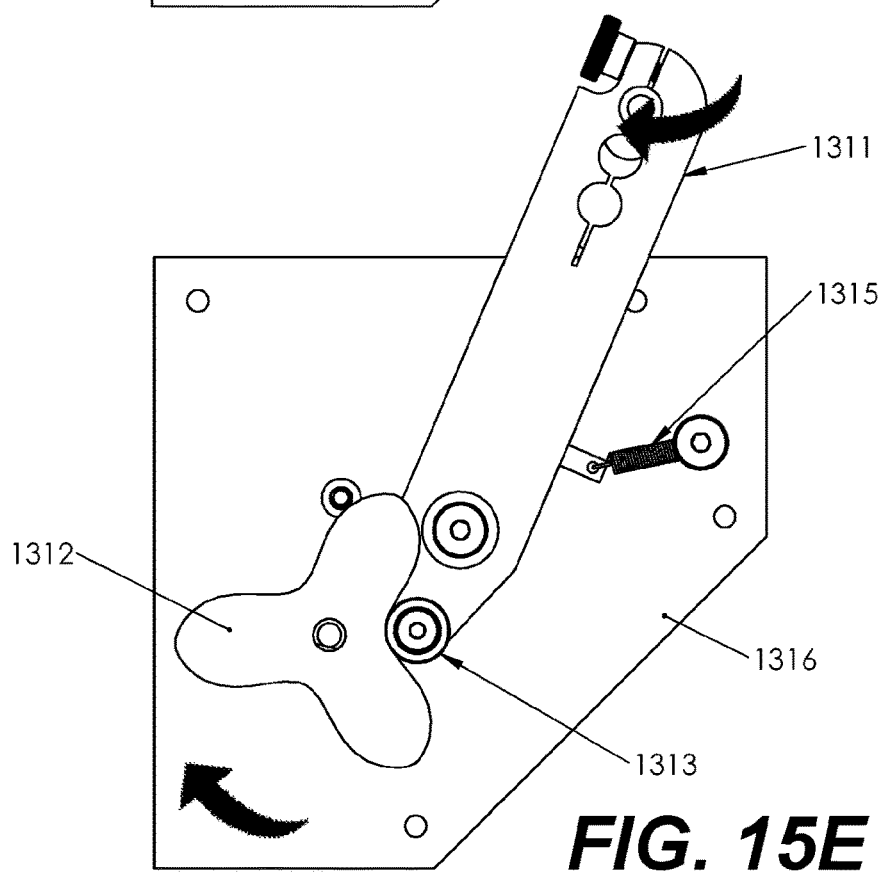

A variety of nozzles (droplet ports, flat even sprays, atomizing and nebulizing nozzles; Spraying Systems Co.), are examined for their ability to purge known impurities from the wet-cake across a range of impurity levels. FIG. 14 shows that the API purity increased due to the filtration process, with the highest purity attained with the use of a wash, which was always in a 1:1 ratio vs. API $M_F$. At a fixed residence time (1 min), a distinct increase in the API purity is noticeable for the sample containing 6 wt % impurity at 4 g/min and 5 g/min. This correlates to the increased cake wash flow rate (as $M_F$ increased, so did the spray volume), suggesting that there was less effective distribution of the solvent wash at lower API mass flow rates.

FIG. 14 also indicates that the final purity level is proportional to the initial concentration of impurities. Starting with an initial impurity loading of 1.0%, the filter produces a wet cake at >99.9% purity, while an impurity loading of 6% furnished material with a final purity around 99%. This could easily be optimized by changing the wash and the operating conditions of the filter. In addition, FIG. 14 also indicates that the filtration process (without the wash) is effective in improving purity, while the washing mechanism provided the additional purification required to achieve desired API purity levels.

The invention claimed is:

1. An apparatus for continuously processing a pharmaceutical slurry comprising:
    a housing;
    a slurry feed and solvent wash assembly (1300) comprising a slurry feed block (1301) and a slurry distributor (1304) configured to deliver said pharmaceutical slurry onto the surface of a removable rotatable filter plate (1101) having a porous surface with a pore size D90 of 0.01 microns (μm) to 100 μm;
    a rotatable vacuum filter assembly comprising
        said removable rotatable filter plate (1101) secured by a filter plate retaining ring (1103) to a rotatable filter support plate (1104), said rotatable filter support plate (1104) comprising a plurality of holes adapted to convey a filtrate onto a rotatable bottom vacuum plate (1105), and
        a filtrate outlet (1107) adapted to convey said filtrate from said rotatable bottom vacuum plate (1105) through a center shaft (1106) and out of said housing under vacuum,
        wherein said rotatable vacuum filter assembly forms a sealed inner space between said rotatable filter support plate (1104) and said rotatable bottom vacuum plate (1105) that is in fluid communication with said filtrate outlet (1107);
    an inner plate rotator for rotating said rotatable vacuum filter assembly;
    a filter cake outlet (1102) located at a center of said removable rotatable filter plate (1101) and held in place by a filter cake outlet nut (1109); and
    an auger subassembly comprising an auger (1402) enclosed in an auger housing (1401), and a scraper (1403) attached to said auger housing (1401) and secured by a scraper holder (1404), said scraper (1403) and said auger (1402) configured to remove a solid filter cake from said surface of said removable rotatable filter plate (1101),
    wherein said pharmaceutical slurry comprises an active pharmaceutical ingredient (API) or a pharmaceutical intermediate.

2. The apparatus of claim 1, wherein said slurry feed and solvent wash assembly (1300) further comprises a wash solvent block (1302) and a slurry wash block (1305).

3. The apparatus of claim 2, wherein said wash solvent block (1302) comprises one or more nozzles for applying a washing solvent to said filter cake, selected from the group consisting of drip nozzles, pneumatic spray nozzles, non-pneumatic misting nozzles, electrospray nozzles, ultrasonic spray nozzles, and ultrasonic nebulizers.

4. The apparatus of claim 1, wherein said removable rotatable filter plate (1101) further comprises a coating.

5. The apparatus of claim 1, further comprising an in-line cleaner for continuously cleaning one or more components of said apparatus.

6. The apparatus of claim 1, wherein one or more components of said apparatus are compatible with a solvent selected from the group consisting of acetone, acetonitrile, benzene, 1-butanol, 2-butanol, 2-butanone, carbon tetrachloride, chlorobenzene, chloroform, cyclohexane, cyclopentylmethyl ether, 1,2-dichloroethane, diethylene glycol, diethyl ether, dimethyl sulfoxide, ethanol, ethyl acetate, heptane, hexane, methanol, methyl t-butyl ether, methyl isobutyl ketone, methylene chloride, N-methyl-2-pyrrolidinone, nitromethane, pentane, ligroine, tetrahydrofuran, toluene, triethylamine, o-xylene, m-xylene, p-xylene, and combinations thereof.

7. The apparatus of claim 1, wherein the distance between said scraper (1403) and said removable rotatable filter plate (1101) is adjustable.

8. The apparatus of claim 1, wherein said slurry distributor (1304) homogeneously distributes said pharmaceutical slurry over said surface of said removable rotatable filter plate (1101), and wherein said slurry distributor (1304) is adjustable to a distance from said removable rotatable filter plate (1101) of 0.2 millimeters (mm) to 25 mm.

9. The apparatus of claim 1, further comprising a feedback loop comprising a detector and a controller, wherein
    said detector is selected from the group consisting of a laser sensor, an ultrasonic sensor, an ultraviolet-visible reflective optical sensor, and a vision system camera;
    said controller is able to adjust one or more parameters in real time, wherein said one or more parameters is selected from the group consisting of rotation speed, auger speed, pressure, flow rate, and inlet volumetric feed rate; and
    said feedback loop maintains a constant thickness of said solid filter cake on said removable rotatable filter plate (1101).

10. The apparatus of claim 9, wherein said feedback loop further comprises a cake height sensor (1702) for detecting the height of the said filter cake on said removable rotatable filter plate (1101).

11. The apparatus of claim 1, wherein said filter plate retaining ring (1103) comprises an overflow lip that limits the thickness of said solid filter cake on said removable rotatable filter plate (1101).

12. A method of continuously filtering a stream of a pharmaceutical slurry comprising:
    a) providing said stream of a pharmaceutical slurry to an apparatus, said apparatus comprising:
        a housing;
        a slurry feed and solvent wash assembly (1300) comprising a slurry feed block (1301) and a slurry distributor (1304) configured to deliver said pharmaceutical slurry onto the surface of a removable rotatable filter plate (1101) having a porous surface with a pore size D90 of 0.01 microns (μm) to 100 μm;
        a rotatable vacuum filter assembly comprising
            said removable rotatable filter plate (1101) secured by a filter plate retaining ring (1103) to a rotatable filter support plate (1104), said rotatable filter support plate (1104) comprising a plurality of holes adapted to convey a filtrate onto a rotatable bottom vacuum plate (1105), and a filtrate outlet (1107) adapted to convey said filtrate from said rotatable bottom vacuum plate (1105) through a center shaft (1106) and out of said housing under vacuum, wherein said rotatable vacuum filter assembly forms a sealed inner space between said rotatable filter support plate (1104) and said rotatable bottom vacuum plate (1105) that is in fluid communication with said filtrate outlet (1107), an inner plate rotator for rotating said rotatable vacuum filter assembly;

a filter cake outlet (1102) located at a center of said removable rotatable filter plate (1101) and held in place by a filter cake outlet nut (1109), and an auger subassembly comprising an auger (1402) enclosed in an auger housing (1401), and a scraper (1403) attached to said auger housing (1401) and secured by a scraper holder (1404), said scraper (1403) and said auger (1402) configured to remove a solid filter cake from said surface of said removable rotatable filter plate (1101);

b) rotating said removable rotatable filter plate (1101);

c) filtering said pharmaceutical slurry through said removable rotatable filter plate (1101) to form said filtrate and said solid filter cake;

d) passing said filtrate through said filtrate outlet (1107);

e) removing said solid filter cake from said removable rotatable filter plate (1101) through the combined action of said scraper (1403) and said auger (1402); and f) passing said solid filter cake through said filter cake outlet (1102), wherein said pharmaceutical slurry comprises an active pharmaceutical ingredient (API) or a pharmaceutical intermediate.

13. The method of claim 12, wherein said continuous filtering is at steady state with respect to the incoming flow rate of said pharmaceutical slurry, the concentration of said pharmaceutical slurry, the composition of said pharmaceutical slurry, and any combination thereof.

14. The method of claim 12, wherein said slurry feed and solvent wash assembly (1300) further comprises a slurry wash block (1305) and a wash solvent block (1302).

15. The method of claim 12, wherein said apparatus outputs between 0.001 to 1500 kilograms (kg) of said filter cake per hour.

16. The method of claim 12, wherein said apparatus further comprises an in-line cleaner, and wherein said method further comprises the step of applying a cleaning solvent to one or more components of said apparatus with said in-line cleaner.

* * * * *

UNITED STATES PATENT AND TRADEMARK OFFICE
CERTIFICATE OF CORRECTION

PATENT NO. : 11,338,228 B2
APPLICATION NO. : 16/075007
DATED : May 24, 2022
INVENTOR(S) : Stephen C. Born et al.

Page 1 of 1

It is certified that error appears in the above-identified patent and that said Letters Patent is hereby corrected as shown below:

In the Claims

In Column 37, Line 9, change "," to --;--; and

In Column 37, Line 14, change "," to --;--.

Signed and Sealed this
Twenty-eighth Day of February, 2023

Katherine Kelly Vidal
*Director of the United States Patent and Trademark Office*